United States Patent
Kojima et al.

(10) Patent No.: US 10,597,491 B2
(45) Date of Patent: Mar. 24, 2020

(54) METAL FINE PARTICLE DISPERSANT CONTAINING BRANCHED POLYMER COMPOUND HAVING AMMONIUM GROUP

(71) Applicants: NISSAN CHEMICAL INDUSTRIES, LTD., Tokyo (JP); KYUSHU UNIVERSITY, Fukuoka-shi, Fukuoka (JP)

(72) Inventors: Keisuke Kojima, Chiba (JP); Akihiro Tanaka, Chiba (JP); Keisuke Odoi, Tokyo (JP); Hideo Nagashima, Fukuoka (JP); Takashi Sue, Fukuoka (JP)

(73) Assignees: NISSAN CHEMICAL CORPORATION, Tokyo (JP); KYUSHU UNIVERSITY, Fukuoka (JP)

( * ) Notice: Subject to any disclaimer, the term of this patent is extended or adjusted under 35 U.S.C. 154(b) by 0 days.

(21) Appl. No.: 16/533,304

(22) Filed: Aug. 6, 2019

(65) Prior Publication Data
US 2019/0359771 A1   Nov. 28, 2019

Related U.S. Application Data

(62) Division of application No. 14/218,469, filed on Mar. 18, 2014, now abandoned, which is a division of application No. 13/060,129, filed as application No. PCT/JP2009/064670 on Aug. 21, 2009, now Pat. No. 8,722,562.

(30) Foreign Application Priority Data

Aug. 22, 2008  (JP) ................................. 2008-214677
Feb. 27, 2009  (JP) ................................. 2009-047110

(51) Int. Cl.
| | |
|---|---|
| *C08F 8/20* | (2006.01) |
| *C08G 73/00* | (2006.01) |
| *B01J 31/02* | (2006.01) |
| *B01F 17/00* | (2006.01) |
| *C08K 3/08* | (2006.01) |
| *H01M 4/86* | (2006.01) |
| *B01J 31/06* | (2006.01) |
| *H01M 4/90* | (2006.01) |

(52) U.S. Cl.
CPC ............ *C08G 73/00* (2013.01); *B01F 17/005* (2013.01); *B01F 17/0007* (2013.01); *B01J 31/0239* (2013.01); *B01J 31/06* (2013.01); *C08K 3/08* (2013.01); *H01M 4/8668* (2013.01); *B01J 2231/643* (2013.01); *B01J 2231/645* (2013.01); *B01J 2531/828* (2013.01); *H01M 4/90* (2013.01)

(58) Field of Classification Search
None
See application file for complete search history.

(56) References Cited

U.S. PATENT DOCUMENTS

| 6,712,997 B2 | 3/2004 | Won et al. |
| 8,227,022 B2 | 7/2012 | Magdassi et al. |
| 2010/0048845 A1 | 2/2010 | Yasui et al. |

FOREIGN PATENT DOCUMENTS

| EP | 1852928 A1 | 11/2007 |
| EP | 2058338 A1 | 5/2009 |
| JP | H11-80647 A | 3/1999 |
| JP | H11-209878 A | 8/1999 |
| JP | 2002-1095 A | 1/2002 |
| JP | 2002-179931 A | 6/2002 |
| JP | 2003-193118 A | 7/2003 |
| JP | 2003-208900 A | 7/2003 |
| JP | 2008-37884 A | 2/2008 |
| WO | 02/094954 A1 | 11/2002 |
| WO | 2006/072959 A1 | 7/2006 |
| WO | 2008/029688 A1 | 3/2008 |

OTHER PUBLICATIONS

Brust et al., "Synthesis of Thiol-derivatised Gold Nanoparticles in a Two-phase Liquid-Liquid System," J. Chem. Soc., Chem. Commun.; 1994; pp. 801-802.
Zhao et al., "Dithiocarbamate Assembly on Gold," J. Am. Chem. Soc., 2005; pp. 7328-7329; vol. 127, American Chemical Society.
International Search Report dated Sep. 29, 2009 in corresponding International Application No. PCT/JP2009/064670 (with translation).
Sep. 23, 2011 Search Report issued for European Application No. 09808322.3.

*Primary Examiner* — Yun Qian
(74) *Attorney, Agent, or Firm* — Oliff PLC

(57) ABSTRACT

A complex that includes a metal fine particle dispersant including a branched polymer compound having an ammonium group and having a weight average molecular weight of 500 to 5,000,000; and a metal fine particle, wherein the metal fine particle includes platinum (Pt) or palladium (Pd), the metal fine particle dispersant includes a branched polymer compound of Formula (1):

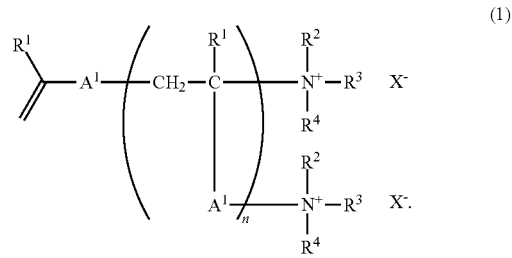

3 Claims, 18 Drawing Sheets

BEFORE REACTION → AFTER REACTION 20 nm 20 nm

METAL FINE PARTICLE DISPERSANT CONTAINING BRANCHED POLYMER COMPOUND HAVING AMMONIUM GROUP

This is a Division of application Ser. No. 14/218,469 filed Mar. 18, 2014, which in turn is a Division of application Ser. No. 13/060,129 filed Apr. 8, 2011 (now U.S. Pat. No. 8,722,562), which in turn is a National Phase Application of PCT/JP2009/064670 filed on Aug. 21, 2009, which claims the benefit of Japanese Patent Application No. 2009-047110 filed on Feb. 27, 2009 and Japanese Patent Application No. 2008-214677 filed on Aug. 22, 2008. The disclosure of the prior applications is hereby incorporated by reference herein in its entirety.

TECHNICAL FIELD

The present invention relates to: a metal fine particle dispersant containing a branched polymer compound having an ammonium group that is characterized by being excellent in dispersibility in an organic solvent, an aqueous solvent, or a resin; and a composition containing the metal fine particle dispersant and metal fine particles.

BACKGROUND ART

The metal fine particle having a particle diameter of around several nm to several tens nm exhibits various physical and chemical properties different from those of a bulk metal. For example, as an optical property, it is known from old times that by a color developing mechanism called a plasmon absorption, the metal fine particle exhibits a particular hue corresponding to the type and the size of a metal, and a solution of the metal fine particle is used as a colorant of a coating or the like. Besides this application, the metal fine particle has widespread applications such as conductive pastes, transparent conductive films, high-density recording materials, light shading filters, chemical sensors, catalysts, light guiding members, gas barrier materials, light scattering-reflecting members, light diffusing members, photosensitive materials, photoelectric conversion elements, inks for inkjet, high dielectric constant materials, and fluorescent materials.

Although as the production method of such a metal fine particle, there can be mentioned a gas phase method and a liquid phase method, the liquid phase method is of lower cost and can easily obtain advantageous fine particles having a narrow particle size distribution. Generally, the liquid phase method is a method of reducing a metal ion with a reductant in a state in which an organic dispersant having affinity with a metal is added to a metal salt solution to prepare metal fine particles. Representative examples of the dispersant include citric acid, surfactants, low molecular weight compounds having a thiol group or an amino group, and polymers such as polyvinyl pyrrolidone.

Patent Document 1 and Non-patent Document 1 describe a preparation method of a metal fine particle using a thiol compound. The surface of the thus obtained metal fine particle is solidly coated with the thiol compound, and therefore, the metal fine particle can be recovered as a powder and can be re-dispersed in a solvent. Non-patent Document 2 describes a preparation method of a metal fine particle coated with a low molecular weight compound having a dithiocarbamate group. Thus, a compound having a functional group containing a sulfur atom has high affinity with a metal surface, so that the compound exhibits excellent characteristics as a dispersant of a metal fine particle. However, there is no example of evaluating dispersibility of such a compound in a polymer. Moreover, the compound having a functional group containing a sulfur atom has a problem of activity as a catalyst because of the sulfur atom contained.

A composition containing metal fine particles having a nanometer size is widely used, for example, in a catalytic synthesis of various chemical products and is further expected to be utilized in an environmental catalyst, a hydrogen storage and retrieval reaction, and the like. Although the chemical and physical characteristics of the metal fine particle depend largely on the shape and the size of the particle, generally, a metal fine particle having a nanometer size has high chemical reactivity and the metal fine particles are easily aggregated to become a larger size to lose the characteristics thereof (Non-patent Document 3).

For preventing the above phenomenon, there is a method of dispersing metal fine particles on a solid carrier. For example, as the carrier, there is used a carrier having a pore structure and having a large surface area such as silicon dioxide, aluminum oxide, and zeolite. However, the metal fine particle is supported on such an inorganic solid, and therefore, the metal fine particle cannot be dispersed in an organic solvent, an aqueous solvent, or a resin.

Patent Document 2 describes a dispersion containing metal nano-particles in a dispersion formed by a polymer compound having a branched polyalkyleneimine chain in a solvent. Patent Document 3 describes a colloidal solution using a quaternary ammonium salt as a stabilizing agent for protecting colloidal particles.

Patent Document 4 and Patent Document 5 describe a nanometer-sized metal catalyst dispersed in a dendrimer or a hyperbranched polymer, and Patent Document 6 describes a hyperbranched polymer having an ammonium group at the terminal position of molecule. However, in these Documents, the stability thereof as a powder and the dispersing properties thereof in an organic solvent/aqueous solvent are not evaluated nor referred to, and there is no example of reporting a complex of a metal fine particle stabilized by a branched polymer material having an ammonium group.

DISCLOSURE OF THE INVENTION

Problem to be Solved by the Invention

It is an object of the present invention to provide: a metal fine particle dispersant containing a branched polymer compound having an ammonium group characterized by being excellent in dispersibility in an organic solvent, an aqueous solvent, or a resin; and a composition containing the metal fine particle dispersant and metal fine particles.

Means for Solving the Problem

As a result of assiduous research intended to overcome these disadvantages, the inventors of the present invention have found that a branched polymer having an ammonium group as a functional group at a molecule terminal thereof is effective as a dispersant of metal fine particles and that a composition containing the resultant dispersant and metal fine particles has not only high catalyst activity but also reusability, and have completed the present invention.

That is, the present invention relates to, according to a first aspect, a metal fine particle dispersant for forming a disperse system of metal fine particles containing a branched polymer compound having an ammonium group and having a weight average molecular weight of 500 to 5,000,000, according to a second aspect, a composition containing the metal fine particle dispersant as described in the first aspect and a metal fine particle, according to a third aspect, the composition according to the second aspect, in which an ammonium group of the branched polymer compound is attached to the metal fine particle to form a complex, according to a fourth aspect, the composition according to the second aspect or the third aspect, further containing an organic solvent, according to a fifth aspect, the composition according to the fourth aspect, in which the metal fine particle is dispersed in the organic solvent, according to a sixth aspect, the composition according to the fourth aspect, in which the complex is dispersed in the organic solvent, according to a seventh aspect, the composition according to any one of the second aspect to the sixth aspect, in which the metal fine particle is at least one selected from a group consisting of scandium, titanium, vanadium, chromium, manganese, iron, cobalt, nickel, copper, zinc, gallium, germanium, yttrium, zirconium, niobium, molybdenum, ruthenium, rhodium, palladium, silver, cadmium, indium, tin, antimony, hafnium, tantalum, tungsten, rhenium, osmium, iridium, platinum, gold, mercury, thallium, lead, and bismuth, according to an eighth aspect, the composition according to the seventh aspect, in which the metal fine particle is at least one selected from a group consisting of gold, silver, platinum, copper, nickel, ruthenium, rhodium, palladium, osmium, and iridium, according to a ninth aspect, the composition according to the seventh aspect or the eighth aspect, in which the metal fine particle is a fine particle having an average particle diameter of 1 nm or more and 100 nm or less, according to a tenth aspect, the composition according to any one of the second aspect to the ninth aspect, in which the metal fine particle dispersant contains a branched polymer compound of Formula (1):

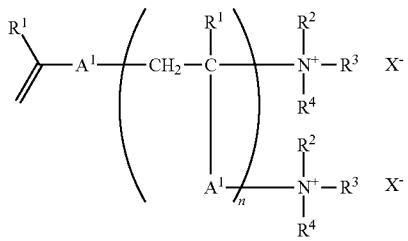

(1)

[where $R^1$ is a hydrogen atom or a methyl group,
$R^2$, $R^3$, and $R^4$ are independently a hydrogen atom, a linear, branched, or cyclic $C_{1-20}$ alkyl group, a $C_{6-20}$ arylalkyl group (where the alkyl group and the arylalkyl group may be substituted with an alkoxy group, a hydroxy group, an ammonium group, a carboxy group, or a cyano group), or —$(CH_2CH_2O)_m$—$R^5$ (where $R^5$ is a hydrogen atom or a methyl group, and m is an arbitrary integer of 2 to 100), or $R^2$, $R^3$, and $R^4$ may be bonded to each other through a linear, branched, or cyclic alkylene group to form a ring together with a nitrogen atom to which $R^2$, $R^3$, and $R^4$ are bonded,
$X^-$ is an anion,
$A^1$ is a structure of Formula (2):

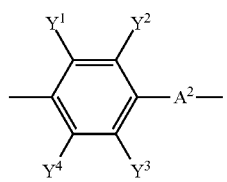

(2)

(where $A^2$ is a linear, branched, or cyclic $C_{1-30}$ alkylene group that may contain an ether bond or an ester bond, and $Y^1$, $Y^2$, $Y^3$, and $Y^4$ are independently a hydrogen atom, a $C_{1-20}$ alkyl group, a $C_{1-20}$ alkoxy group, a nitro group, a hydroxy group, an amino group, a carboxy group, or a cyano group), and
n is the number of repeating unit structures that is an integer of 2 to 100,000], according to an eleventh aspect, the composition according to the tenth aspect, characterized in that $A^1$ is a group of Formula (3):

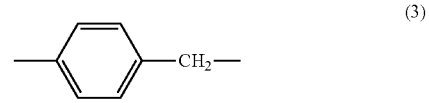

(3)

and
$X^-$ is a halogen atom, $PF_6^-$, $BF_4^-$, or a perfluoroalkanesulfonate, according to a twelfth aspect, the composition according to the second aspect, in which the metal fine particle dispersant is a branched polymer of Formula (4):

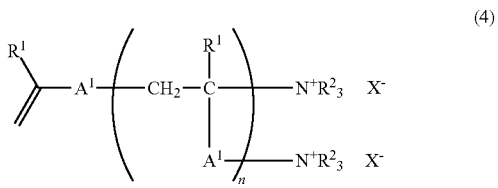

(4)

(where $R^1$ is a hydrogen atom or a methyl group,
$R^2$ is an ether bond-containing alkyl chain of Formula (5):

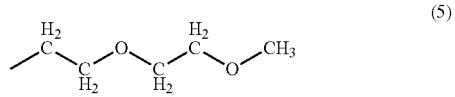

(5)

$X^-$ is an anion,
$A^1$ is a structure of Formula (2), and
n is the number of repeating unit structures that is an integer of 2 to 100,000), according to a thirteenth aspect, a thin film obtained from the composition as described in any one of the second aspect to the twelfth aspect, according to a fourteenth aspect, a production method of the composition as described in the second aspect, including: mixing the metal fine particle dispersant with a metal salt; and adding a reductant to the resultant mixture to reduce the metal salt in the mixture to prepare metal fine particles, according to a fifteenth aspect, a production method of the composition as described in the second aspect, characterized by including mixing the metal fine particle dispersant with a metal fine particle complexed with a phosphine-based or amine-based dispersant to substitute a ligand, according to a sixteenth aspect, a reduction catalyst containing the composition as described in any one of the second aspect to the twelfth aspect, according to a seventeenth aspect, a reduction catalyst containing the composition as described in the twelfth aspect for effecting a reduction reaction in water, and according to an eighteenth aspect, an electrode for a fuel battery containing the composition as described in any one of the second aspect to the twelfth aspect.

Effects of the Invention

Metal fine particles dispersed by the branched polymer having an ammonium group of the present invention can be recovered as a powder and are stable exhibiting no aggregation at normal temperature under normal pressure. The metal fine particles can easily be re-dispersed in an organic solvent or water and can be used repeatedly as a catalyst.

BEST MODES FOR CARRYING OUT THE INVENTION

Figure 1:
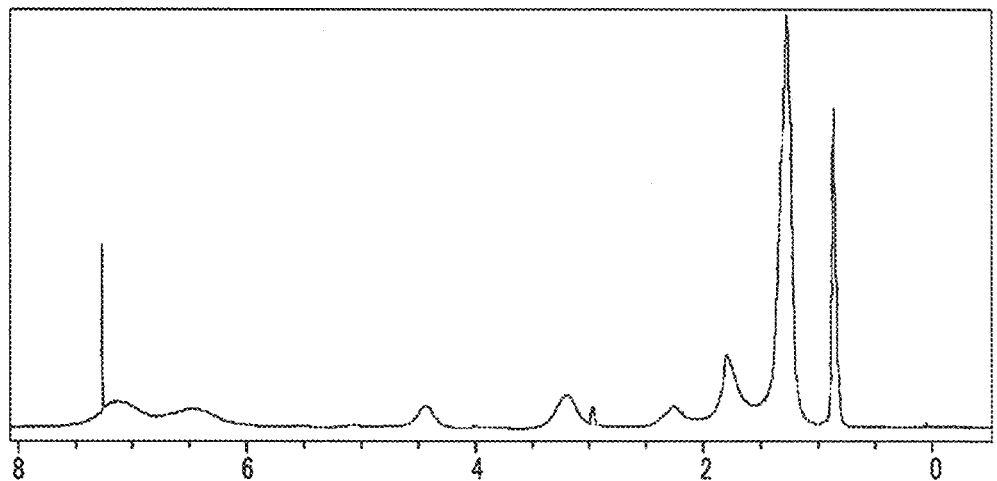
FIG. 1 shows $^1$H-NMR spectrum of HPS obtained in Example 1.

Hereinafter, the present invention is described more in detail.

The metal fine particle dispersant of the present invention contains a branched polymer compound having an ammonium group and examples of the branched polymer compound include polymer compounds having a structure of Formula (1):

$$\text{(1)}$$

In Formula (1), $R^1$ is a hydrogen atom or a methyl group. In Formula (1), $R^2$, $R^3$, and $R^4$ are independently a hydrogen atom, a linear, branched, or cyclic $C_{1-20}$ alkyl group, a $C_{6-20}$ arylalkyl group, or $-(CH_2CH_2O)_m-R^5$ (where $R^5$ is a hydrogen atom or a methyl group, and m is an arbitrary integer of 2 to 100). The alkyl group and the arylalkyl group may be substituted with an alkoxy group, a hydroxy group, an ammonium group, a carboxy group, or a cyano group. $R^2$, $R^3$, and $R^4$ may be bonded to each other through a linear, branched, or cyclic alkylene group to form a ring together with a nitrogen atom to which $R^2$, $R^3$, and $R^4$ are bonded. In Formula (1), $X^-$ is an anion and preferred examples of $X^-$ include a halogen atom, $PF_6^-$, $BF_4^-$, and a perfluoroalkanesulfonate. In Formula (1), $A^1$ is a structure of Formula (2):

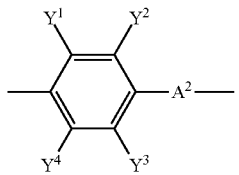

(2)

(where $A^2$ is a linear, branched, or cyclic $C_{1-30}$ alkylene group that may contain an ether bond or an ester bond, and $Y^1$, $Y^2$, $Y^3$, and $Y^4$ are independently a hydrogen atom, a $C_{1-20}$ alkyl group, a $C_{1-20}$ alkoxy group, a nitro group, a hydroxy group, an amino group, a carboxy group, or a cyano group). Preferably, $A^1$ is a structure of Formula (3):

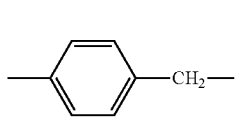

(3)

In Formula (1), n is the number of repeating unit structures that is an integer of 2 to 100,000.

Examples of the linear $C_{1-20}$ alkyl group of $R^2$, $R^3$, and $R^4$ include a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group, and an n-eicosyl group. Examples of the branched $C_{1-20}$ alkyl group include an isopropyl group, an isobutyl group, a sec-butyl group, and a tert-butyl group. Examples of the cyclic $C_{1-20}$ alkyl group include groups having a cyclopentyl ring and groups having a cyclohexyl ring structure. Examples of the $C_{7-20}$ arylalkyl group include a benzyl group and a phenethyl group.

Examples of the alkylene group that may bond $R^2$, $R^3$, and $R^4$ include linear alkylene groups such as a methylene group, an ethylene group, an n-propylene group, an n-butylene group, and an n-hexylene group. Examples of the branched alkylene group include an isopropylene group, an isobutylene group, and a 2-methylpropylene group. Examples of the cyclic alkylene group include $C_{3-30}$ alicyclic aliphatic groups having a monocyclic, polycyclic, or crosslinked-cyclic structure. Specific examples thereof include groups having a monocyclo, bicyclo, tricyclo, tetracyclo, or pentacyclo structure of a carbon atom number of 4 or more.

Further, in the structure of Formula (1), $R^2$, $R^3$, and $R^4$ may be bonded to each other to form a ring together with a nitrogen atom to which they are bonded and examples of the ring include a pyridine ring, a pyrimidine ring, a pyrazine ring, a quinoline ring, and a bipyridyl ring.

Examples of the branched polymer compound of the metal fine particle dispersant of the present invention include branched polymer compounds having a structure of Formula (4):

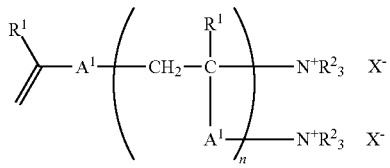

(4)

In Formula (4), $R^1$ is a hydrogen atom or a methyl group. In Formula (4), $R^2$ is an ether bond-containing alkyl chain of Formula (5):

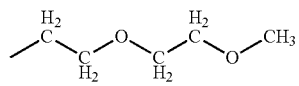

(5)

In Formula (4), $X^-$ is an anion. In Formula (4), $A^1$ is a structure of Formula (2). In Formula (4), n is the number of repeating unit structures that is an integer of 2 to 100,000.

Next, the production method of a branched polymer compound having an amino group at a molecule terminal thereof is described.

The branched polymer compound having an amino group at a molecule terminal thereof can be obtained, for example, by reacting a branched polymer compound having a halogen atom at a molecule terminal thereof with an amine compound.

Here, the branched polymer compound having a halogen atom at a molecule terminal thereof can be synthesized according to a description in International Publication No. WO 2008/029688 pamphlet.

Examples of the amine compound capable of being used for the present reaction as a primary amine include: aliphatic amines such as N-methylamine, N-ethylamine, N-n-propylamine, N-isopropylamine, N-n-butylamine, N-n-isobutylamine, N-sec-butylamine, N-tert-butylamine, N-n-pentylamine, N-n-hexylamine, N-n-heptylamine, N-n-octylamine, N-n-nonylamine, N-n-decylamine, N-n-undecylamine, N-n-dodecylamine, N-n-tridecylamine, N-n-tetradecylamine, N-n-pentadecylamine, N-n-hexadecylamine, N-n-heptadecylamine, N-n-octadecylamine, N-n-nonadecylamine, and N-n-eicosylamine; alicyclic amines such as N-cyclopentylamine and N-cyclohexylamine; and aromatic amines, for example, anilines such as aniline, p-n-butylaniline, p-tert-butylaniline, p-n-octylaniline, p-n-decylaniline, p-n-dodecylaniline, and p-n-tetradecylaniline, alkyl phenols such as N-benzylamine and N-(2-phenylethyl)amine, naphthylamines such as 1-naphthylamine and 2-naphthylamine, aminoanthracenes such as 1-aminoanthracene and 2-aminoanthracene, aminoanthraquinones such as 1-aminoanthraquinone, aminobiphenyls such as 4-aminobiphenyl and 2-aminobiphenyl, aminofluorenones such as 2-aminofluorene-aminofluorene, 1-amino-9-fluorenone, and 4-amino-9-fluorenone, aminoindanes such as 5-aminoindane, aminoisoquinolines such as 5-aminoisoquinoline, and aminophenanthrene such as 9-aminophenanthrene. Examples of the primary amine further include amine compounds such as N-(tert-butoxycarbonyl)-1,2-ethylenediamine, N-(tert-butoxycarbonyl)-1,3-propylenediamine, N-(tert-butoxycarbonyl)-1,4-butylenediamine, N-(tert-butoxycarbonyl)-1,5-pentamethylenediamine, N-(tert-butoxycarbonyl)-1,6- hexamethylenediamine, N-(2-hydroxyethyl)amine, N-(3-hydroxypropyl)amine, N-(2-methoxyethyl)amine, and N-(2-ethoxyethyl)amine.

Examples of the amine compound as a secondary amine include: aliphatic amines such as N,N-dimethylamine, N,N-diethylamine, N,N-di-n-propylamine, N,N-di-isopropylamine, N,N-di-n-butylamine, N,N-n-isobutylamine, N,N-di-sec-butylamine, N,N-n-pentylamine, N-methyl-N-ethylamine, N-methyl-N-n-propylamine, N-methyl-N-n-butylamine, N-methyl-N-n-pentylamine, N-ethyl-N-isopropylamine, N-ethyl-N-n-butylamine, N-ethyl-N-n-pentylamine, N-methyl-N-n-octylamine, N-methyl-N-n-decylamine, N-methyl-N-n-dodecylamine, N-methyl-N-n-tetradecylamine, N-methyl-N-n-hexadecylamine, N-methyl-N-n-octadecylamine, N-ethyl-N-isopropylamine, N-ethyl-N-octylamine, N,N-di-n-hexylamine, N,N-dioctylamine, N,N-didodecylamine, N,N-dihexadecylamine, and N,N-dioctadecylamine; alicyclic amines such as N,N-dicyclohexylamine; aromatic amines such as N,N-diphenylamine and N,N-dibenzylamine; and nitrogen-containing heterocyclic compounds such as phthalimide, pyrrole, piperidine, piperazine, and imidazole. Examples of the secondary amine further include N,N-di(2-hydroxyethyl)amine, N,N-di(3-hydroxypropyl)amine, N,N-di(ethoxyethyl)amine, and N,N-di(propoxyethyl)amine.

Examples of the amine compound as a tertiary amine include: aliphatic amines such as trimethylamine, triethylamine, tripropylamine, tributylamine, tripentylamine, N,N-dimethyl-N-octylamine, N,N-diethyl-N-n-decylamine, N,N-dimethyl-N-n-dodecylamine, N,N-dimethyl-N-n-tetradecylamine, N,N-dimethyl-N-n-hexadecylamine, N,N-dimethyl-N-n-octadecylamine, N,N-dimethyl-N-n-eicosylamine, and N,N-dimethyl-N-n-dodecylamine; and nitrogen-containing heterocyclic compounds such as pyridine, pyrazine, pyrimidine, quinoline, 1-methylimidazole, 4,4'-bipyridyl, and 4-methyl4,4'-bipyridyl.

The used amount of the amine compound capable of being used for the reaction may be 0.1 to 20 times molar equivalent, preferably 0.5 to 10 times molar equivalent, more preferably 1 to 5 time(s) molar equivalent, relative to 1 molar equivalent of a halogen atom in a branched polymer compound having a halogen atom at a molecule terminal thereof. As the reaction conditions, the reaction time and the reaction temperature are accordingly selected from 0.01 to 100 hours and 0 to 300° C. Preferably, the reaction time is 0.1 to 10 hours and the reaction temperature is 20 to 150° C.

The reaction between a halogen atom at a molecule terminal and an amine compound may be effected in water or an organic solvent solution in the presence or absence of a base. The used solvent is preferably a solvent capable of dissolving a branched polymer compound having a halogen atom and an amine compound. Further, when the solvent is a solvent capable of dissolving a branched polymer compound having a halogen atom and an amine compound, but incapable of dissolving a branched polymer compound having an ammonium group at a molecule terminal thereof, the isolation becomes easy, which is more preferred.

The organic solvent may be any solvent so long as the solvent does not remarkably inhibit the progression of the present reaction, and examples thereof include: water; organic acid solvents such as acetic acid; aromatic hydrocarbons such as benzene, toluene, xylene, ethylbenzene, and 1,2-dichlorobenzene; ether compounds such as tetrahydrofuran and diethyl ether; ketone compounds such as acetone, methyl ethyl ketone, methyl isobutyl ketone, and cyclohexanone; and aliphatic hydrocarbons such as chloroform, dichloromethane, 1,2-dichloroethane, n-heptane, n-hexane, cyclohexane, dimethylformamide, dimethylacetamide, and N-methylpyrrolidone. These solvents may be used individually or in combination of two or more types thereof. The used amount of the organic solvent is 0.2 to 1,000 times mass, preferably 1 to 500 time(s) mass, more preferably 5 to 100 times mass, most preferably 10 to 50 times mass, based on the mass of the branched polymer compound having a halogen atom at a molecule terminal thereof. In this reaction, oxygen in the reaction system is necessary to be thoroughly removed before the initiation of the reaction and therefore, it is preferred that the inside of the reaction system is purged with an inert gas such as nitrogen and argon. The reaction conditions are accordingly selected from reaction times of 0.01 to 100 hours and reaction temperatures of 0 to 200° C. Preferably, the reaction time is 0.1 to 5 hours and the reaction temperature is 20 to 150° C.

Generally, preferred examples of the base include: inorganic compounds such as alkali metal hydroxides and alkaline earth metal hydroxides, alkali metal oxides and alkaline earth metal oxides, alkali metal hydrides and alkaline earth metal hydrides, alkali metal amides, alkali metal carbonates and alkaline earth metal carbonates (such as lithium carbonate, potassium carbonate, and calcium carbonate), and alkali metal bicarbonates (such as sodium bicarbonate); and organic metal compounds such as alkali metal alkyls, alkyl magnesium halides, alkali metal alkoxides, alkaline earth metal alkoxides, and dimethoxy magnesium. Among them, particularly preferred are potassium carbonate and sodium carbonate. The used amount of the base is 0.2 to 10 times equivalents, preferably 0.5 to 10 equivalents, most preferably 1 to 5 equivalent(s), based on the mass of the branched polymer compound having a halogen atom at a molecule terminal thereof.

In the case where a tertiary amine is used in the presence of a base, a branched polymer compound of Formula (1) can be obtained.

When a primary amine compound or a secondary amine compound is reacted with a branched polymer compound having a halogen atom at a molecule terminal thereof in the absence of a base to obtain a branched polymer compound having an amine terminal at a molecule terminal thereof, there is obtained a branched polymer compound having an ammonium group terminal in which the corresponding terminal secondary amine or the corresponding terminal tertiary amine of the branched polymer compound is protonated.

Also, in the case where the reaction is effected using a base, by mixing the reaction mixture with an aqueous solution of an acid such as hydrochloric acid, hydrogen bromide, and hydrogen iodide in an organic solvent, there is obtained a branched polymer compound having an ammonium group terminal in which the corresponding terminal secondary amine or the corresponding terminal tertiary amine of the branched polymer compound is protonated.

The branched polymer compound has a weight average molecular weight Mw measured by gel permeation chromatography of 500 to 5,000,000, preferably 1,000 to 1,000,000, more preferably 2,000 to 500,000, most preferably 3,000 to 200,000, in terms of polystyrene. The branched polymer compound has a degree of distribution Mw (weight average molecular weight)/Mn (number average molecular weight) of 1.0 to 7.0, preferably 1.1 to 6.0, more preferably 1.2 to 5.0.

The composition of the present invention contains the metal fine particle dispersant and metal fine particles, and the metal fine particle dispersant and the metal fine particles form preferably a complex.

Here, in the complex, by an action of an ammonium group contained in the branched polymer compound that is a metal fine particle dispersant, the metal fine particle dispersant and the metal fine particle coexist in such a state that they are contacted with or adjacent to each other to form a particle-shape. In other words, the complex is described as a complex having a structure in which an ammonium group of the metal fine particle dispersant (branched polymer compound) is attached to or coordinated with metal fine particles.

Accordingly, as described above, the "complex" of the present invention may includes not only a complex formed by bonding the metal fine particles with the metal fine particle dispersant, but also a complex in which the metal fine particles and the metal fine particle dispersant do not form a bonding part and they exist independently from each other.

The organic solvent used for the composition of the present invention is not particularly limited so long as the solvent is a solvent capable of dissolving the branched polymer compound. Examples thereof include aromatic hydrocarbons such as benzene, toluene, xylene, and ethylbenzene; ether compounds such as tetrahydrofuran and diethyl ether; ketone compounds such as acetone, methyl ethyl ketone, methyl isobutyl ketone, and cyclohexanone; and aliphatic hydrocarbons such as n-heptane, n-hexane, and cyclohexane. These solvents may be used individually or in combination of two or more types thereof.

The metal fine particle in the composition of the present invention is not particularly limited and examples thereof include scandium, titanium, vanadium, chromium, manganese, iron, cobalt, nickel, copper, zinc, gallium, germanium, yttrium, zirconium, niobium, molybdenum, ruthenium, rhodium, palladium, silver, cadmium, indium, tin, antimony, hafnium, tantalum, tungsten, rhenium, osmium, iridium, platinum, gold, mercury, thallium, lead, and bismuth. These metals may be used individually or as an alloy of two or more types thereof. Preferred examples thereof include gold, silver, platinum, copper, nickel, ruthenium, rhodium, palladium, osmium, and iridium. More preferred examples thereof include Pt and Pd. As the metal fine particle, an oxide of the above metals may also be used.

The metal fine particle can be obtained by reducing a metal ion, for example, by a method of irradiating an aqueous solution of a metal salt with light using a high pressure mercury lamp or by a method of adding a compound having a reducing action (so-called reductant) to the aqueous solution. For example, by adding a metal salt aqueous solution to a solution in which the metal fine particle dispersant (branched polymer compound) is dissolved and irradiating the resultant mixture with an ultraviolet ray or by adding a metal salt aqueous solution and a reductant to the solution to reduce a metal ion, while forming a complex of the metal fine particle dispersant and metal fine particles, the composition of the present invention containing the metal fine particle dispersant and metal fine particles can also be prepared.

Examples of the metal salt include chloroauric acid, silver nitrate, copper sulfate, copper nitrate, copper acetate, tin chloride, platinum chloride, chloroplatinic acid, $Pt(DBA)_2$ [DBA=dibenzylidene acetone], $Pt(cod)_2$ [cod=1,5-cyclooctadiene], $PtMe_2(cod)$, palladium chloride, palladium acetate $(Pd(OAc)_2)$, palladium nitrate, $Pd_2[(DBA)_3(CHCl_3)]$, $Pd(DBA)_2$, rhodium chloride, rhodium acetate, ruthenium chloride, ruthenium acetate, $Ru(cod)(cot)$ [cot=cyclooctatriene], iridium chloride, iridium acetate, and $Ni(cod)_2$.

The reductant is not particularly limited and various reductants can be used. According to the application of the obtained composition, the contained metal species, and the like, the reductant is preferably selected. Examples of the applicable reductant include: metal borohydrides such as sodium borohydride and potassium borohydride; aluminum hydrides such as lithium aluminum hydride, potassium aluminum hydride, cesium aluminum hydride, beryllium aluminum hydride, magnesium aluminum hydride, and calcium aluminum hydride; hydrazine compounds; citric acid and salts thereof; succinic acid and salts thereof; and ascorbic acid and salts thereof.

The metal fine particle has an average particle diameter of preferably 1 to 100 nm. The reason therefore is that when the average particle diameter of the metal fine particle is more than 100 nm, in an optical application, the transmissivity of the thin film is lowered due to scattering, and in a catalyst application, the surface area of the catalyst decreases to lower the catalyst activity. The average particle diameter is more preferably 75 nm or less, most preferably 1 to 30 nm.

The additive amount of the metal fine particle dispersant in the composition of the present invention is preferably 50 to 2,000 parts by mass, relative to 100 parts by weight of the metal fine particle. When the additive amount is less than 50 parts by mass, the dispersibility of the metal fine particle is unsatisfactory and on the other hand, when the additive amount is more than 2,000 parts by mass, the content of organic substances becomes large and disadvantage with respect to the physical properties of the composition becomes easily caused. The additive amount is more preferably 100 to 1,000 parts by mass.

As the metal fine particle dispersant for forming a metal fine particle complex obtained by a metal fine particle dispersant and metal fine particles having low secondary aggregability and having high dispersibility in a nonpolar solvent, a branched polymer containing ammonium trisubstituted with a long-chain alkyl group is preferred. As the metal fine particle dispersant for forming a metal fine particle complex obtained by a metal fine particle dispersant and metal fine particles having low secondary aggregability and having high dispersibility in a polar solvent such as water and an alcohol, a branched polymer containing ammonium having a polyethylene glycol chain is preferred.

The formation of the complex of the branched polymer compound having an ammonium group and metal fine particles is performed simultaneously during the preparation of the composition containing the metal fine particle dispersant (branched polymer compound) and metal fine particles, and examples of the method for forming the complex include: a method including synthesizing metal fine particles stabilized to some extent by a lower ammonium ligand and then exchanging the ligand with a branched polymer compound; and a method of directly reducing a metal ion in a solution of a branched polymer having an ammonium group to form the complex. As described above, by adding an aqueous solution of a metal salt to a solution in which the metal fine particle dispersant is dissolved and irradiating the resultant mixture with an ultraviolet ray, by adding an aqueous solution of a metal salt and a reductant to the solution, or by the like to reduce a metal ion, the complex can be formed.

In the ligand exchanging method, the metal fine particle stabilized to some extent by a lower ammonium ligand as a raw material can be synthesized by a method described in "Journal of Organometallic Chemistry 1996 520 143-162" and the like. By dissolving the branched polymer compound having an ammonium group in the resultant reaction mixture solution of metal fine particles and stirring the resultant reaction solution at room temperature or while heating the solution, the objective metal fine particle complex can be obtained.

Although the solvent to be used is not particularly limited so long as the solvent is a solvent capable of dissolving the metal fine particle and the metal fine particle dispersant to a necessary concentration or more, specific examples thereof include: alcohol solvents such as ethanol and propanol; halogenated hydrocarbons such as methylene chloride and chloroform; cyclic ethers such as tetrahydrofuran, 2-methyltetrahydrofuran, and tetrahydropyran; nitrile solvents such as acetonitrile and butyronitrile; and mixture solutions thereof. Among them, preferred is tetrahydrofuran.

As the temperature for mixing the reaction mixture solution of metal fine particles with the branched polymer compound having an ammonium group, ordinarily, a range of 0° C. to the boiling point of a solvent can be used and a range of room temperature to 60° C. is preferred.

Here, in the ligand exchanging method, also by using a phosphine dispersant (phosphine ligand) other than an amine dispersant (lower ammonium ligand), the metal fine particle can be stabilized to some extent beforehand.

As the direct reducing method, by dissolving a metal ion and the branched polymer compound having an ammonium group in a solvent and effecting the reaction in a hydrogen gas atmosphere, the objective metal fine particle complex can be obtained.

As the metal ion source used here, there can be used the above metal salts and metal carbonyl complexes such as hexacarbonyl chromium [$Cr(CO)_6$], pentacarbonyl iron [$Fe(CO)_5$], octacarbonyl dicobalt [$Co_2(CO)_8$], tetracarbonyl nickel [$Ni(CO)_4$], hexacarbonyl molybdenum [$Mo(CO)_6$], hexadecacarbonyl hexarhodium [$Rh_6(CO)_{16}$], dodecacarbonyl tetrarhodium [$Rh_4(CO)_{12}$], hexacarbonyl tungsten [$W(CO)_6$], decacarbonyl dirhenium [$Re_2(CO)_{10}$], and dodecacarbonyl tetrairidium [$Ir_4(CO)_{12}$]. Moreover, 0-valent metal complexes such as metal olefin complexes, metal phosphine complexes, and metal nitrogen complexes can also be used.

Although the solvent to be used is not particularly limited so long as the solvent is a solvent capable of dissolving a metal ion and the dispersant to a necessary concentration or more, specific examples thereof include: alcohol solvents such as ethanol and propanol; halogenated hydrocarbons such as methylene chloride and chloroform; cyclic ethers such as tetrahydrofuran, 2-methyltetrahydrofuran, and tetrahydropyran; nitrile solvents such as acetonitrile and butyronitrile; and mixture solutions thereof. Among them, preferred is tetrahydrofuran.

As the temperature for mixing a metal ion with the dispersant, ordinarily, a range of 0° C. to the boiling point of a solvent can be used.

As the direct reducing method, by dissolving a metal ion and the branched polymer compound having an ammonium group in a solvent and subjecting the resultant solution to a thermal decomposition reaction, the objective metal fine particle complex can be obtained.

As the metal ion source used here, there can be used the above metal salts, the above metal carbonyl complexes, other 0-valent metal complexes, and metal oxides such as silver oxide.

Although the solvent to be used here is not particularly limited so long as the solvent is a solvent capable of dissolving a metal ion and the dispersant to a necessary concentration or more, specific examples thereof include: alcohol solvents such as methanol, ethanol, n-propanol, 2-propanol, and ethylene glycol; halogenated hydrocarbons such as methylene chloride and chloroform; cyclic ethers such as tetrahydrofuran, 2-methyltetrahydrofuran, and tetrahydropyran; nitrile solvents such as acetonitrile and butyronitrile; aromatic solvents such as benzene and toluene; and mixture solutions thereof. Among them, preferred is toluene.

As the temperature for mixing a metal ion with the dispersant, ordinarily, a range of 0° C. to the boiling point of a solvent can be used and the temperature is preferably around the boiling point of a solvent, for example, in the case of toluene, the temperature is 110° C. (heating reflux).

The composition of the present invention is applicable to a colorant, a conductive paste, a transparent conductive film, a high-density recording material, a light shielding filter, a chemical sensor, a catalyst, a light guiding member, a gas barrier material, a light scattering-reflecting member, a light diffusing member, a photosensitive material, a photoelectric conversion element, an ink for inkjet, a high dielectric constant material, a battery material, a fluorescent material, and the like. The composition can be utilized, for example, particularly in a reduction catalyst and an electrode for a fuel battery.

EXAMPLES

The present invention will be described more in detail hereinafter, referring to Examples which should not be construed as limiting the scope of the present invention.

Here, the analysis apparatuses used in Examples and the analysis conditions are as follows.
$^1$H-NMR spectrum and $^{13}$C-NMR spectrum
    Lambda 600 (600 MHz); manufactured by JEOL
Spin coater
    1H-D7; manufactured by MIKASA
IR (Infrared absorption spectrum)
    FT-IR4200; manufactured by JASCO
TEM (transmission electron microscope)
    Apparatus: JEM 2100F and JEM 2100XS; manufactured by JEOL
    Applying voltage: 200 kV
Ellipsometer
    Apparatus: variable angle spectroscopic ellipsometer VASE; manufactured by J.A. Woollam Japan
    Wavelength: 598 nm
DTA-TG
    Apparatus: SHIMADZU DTG-60; manufactured by Shimadzu Corporation
Gas chromatography (G.C.)
    Apparatus: SHIMADZU GC-17A; manufactured by Shimadzu Corporation
ICP-Mass
    Apparatus: SHIMADZU ICPM-8500; manufactured by Shimadzu Corporation
[Preparation of $HPSNR_3Br$]

Example 1

Trioctylamine

HPS-Br (0.6 g, 3 mmol) was charged into a 25 mL two-neck flask and the inside of the flask was purged with nitrogen. Thereto, 10 mL of toluene was added and further, trioctylamine (2.1 g, 6 mmol) [manufactured by Kanto Chemical Co., Inc.] was added, followed by stirring the resultant reaction mixture at 50° C. for 12 hours. The resultant reaction solution was subjected to a re-precipitation purification using 50 mL of hexane [manufactured by Kanto Chemical Co., Inc.] and the resultant precipitate was filtered and vacuum-dried to obtain a yellow-brown solid 86% (1.4 g) of HPS-N(Octyl)$_3$Br.

Figure 2:
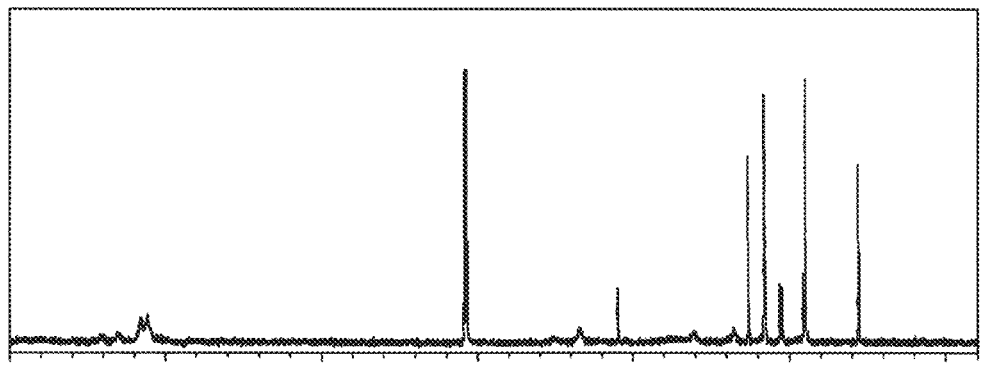
FIG. 2 shows $^{13}$C-NMR spectrum of HPS obtained in Example 1.
Figure 3:
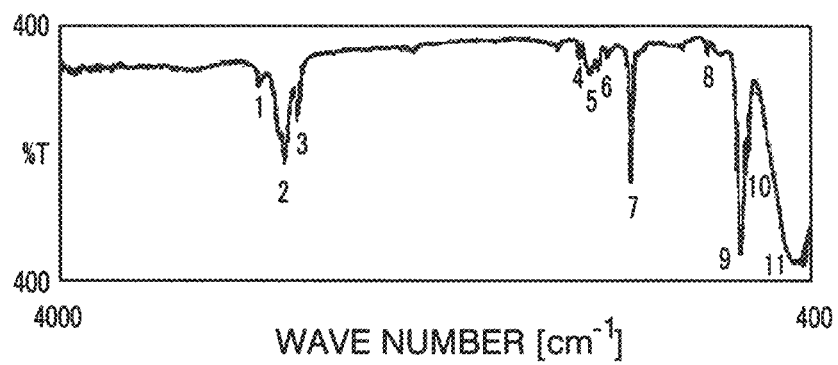
FIG. 3 shows IR spectrum of HPS obtained in Example 1.

The measurement results of $^1$H-NMR spectrum, $^{13}$C-NMR spectrum, and IR spectrum of HPS substituted with trioctyl ammonium are shown in FIG. 1 to FIG. 3, respectively.

Example 2

Tris[2-(2-methoxyethoxy)ethyl]amine

HPS-Br (0.8 g, 4 mmol) was charged into a 50 mL two-neck flask and the inside of the flask was purged with nitrogen. Thereto, 15 mL of tetrahydrofuran (THF) was added and further, tris[2-(2-methoxyethoxy)ethyl]amine (1.3 g, 4 mmol) [manufactured by Tokyo Chemical Industry Co., Ltd.] was added, followed by stirring the resultant reaction mixture at room temperature for 12 hours. The reaction solvent was distilled off under reduced pressure and the resultant solid was washed with hexane, followed by vacuum-drying the solid to obtain a brown solid 92% (2.1 g) of HPS-N(C$_2$H$_4$OC$_2$H$_4$OCH$_3$)$_3$Br.

Figure 4:
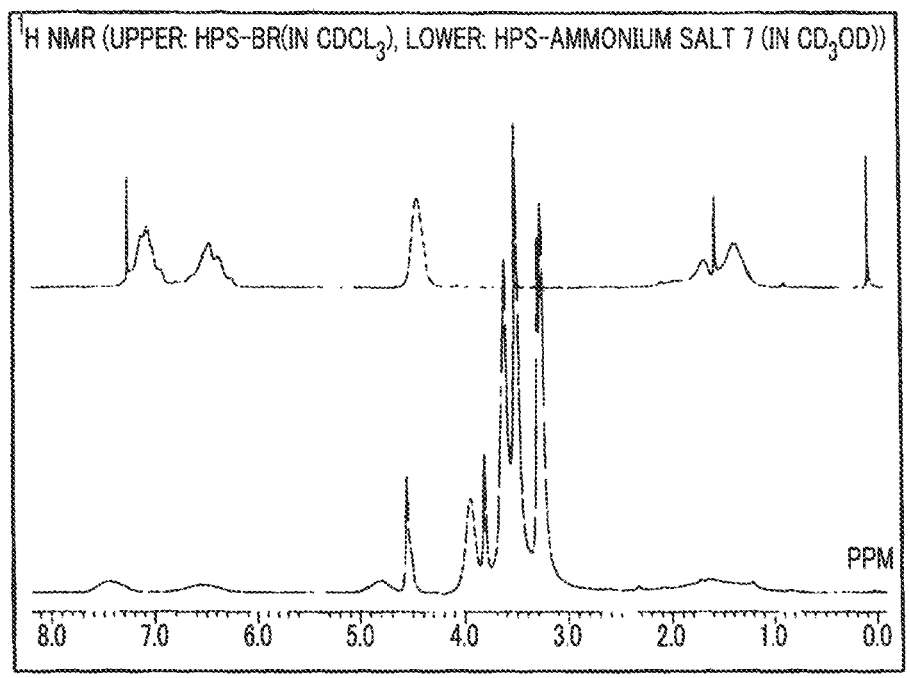
FIG. 4 shows NMR spectrum of HPS obtained in Example 2.
Figure 5:
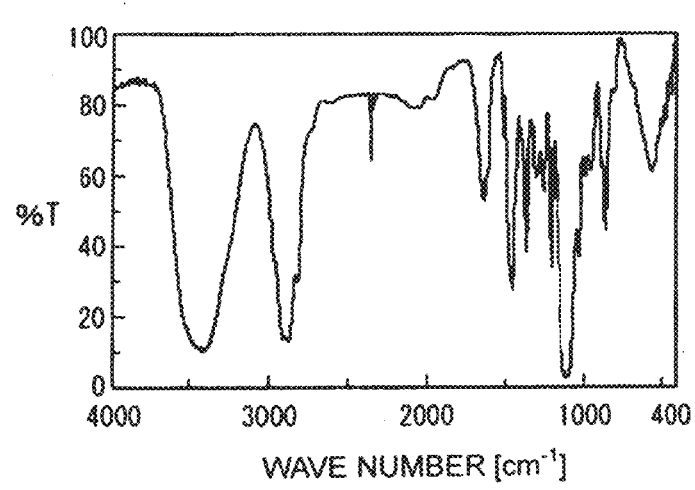
FIG. 5 shows IR spectrum of HPS obtained in Example 2.

The measurement results of IR spectrum and NMR spectrum of HPS substituted with ammonium are shown in FIG. 4 and FIG. 5, respectively.

Example 3

2-dimethylaminoethanol

HPS-Br (50 mg, 0.25 mmol) was charged into a 10 mL two-neck flask and the inside of the flask was purged with nitrogen. Thereto, 3 mL of toluene [manufactured by Kanto Chemical Co., Inc.] was added and further, 2-dimethylaminoethanol (22 mg, 0.25 mmol) [manufactured by Tokyo Chemical Industry Co., Ltd.] was added, followed by stirring the resultant reaction mixture at room temperature for 2 hours. From here, in the same manner as in Example 1, the synthesis was performed.

Figure 6:
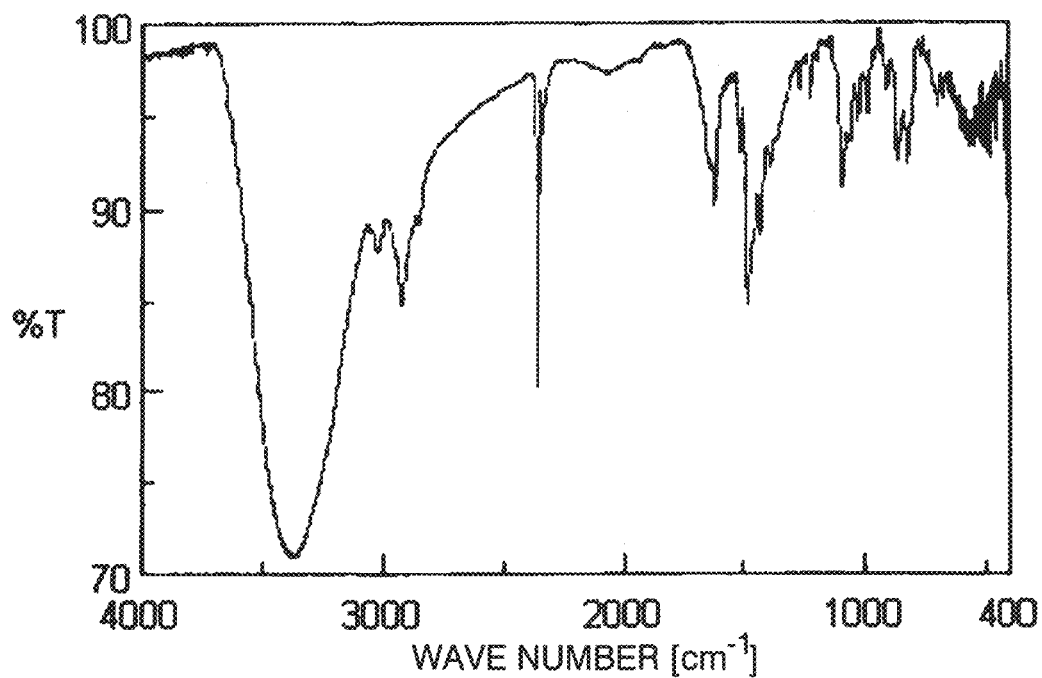
FIG. 6 shows IR spectrum of HPS-N(CH$_3$)$_2$C$_2$H$_4$OH obtained in Example 3.

The measurement result of IR spectrum of the obtained HPS-N(CH$_3$)$_2$C$_2$H$_4$OHBr is shown in FIG. 6.

Example 4

2-(diisopropylamino)ethanol

HPS-Br (50 mg, 0.25 mmol) was charged into a 10 mL two-neck flask and the inside of the flask was purged with nitrogen. Thereto, 3 mL of THF [manufactured by Kanto Chemical Co., Inc.] was added and further, 2-diisopropylaminoethanol (36 mg, 0.25 mmol) [manufactured by Tokyo Chemical Industry Co., Ltd.] was added, followed by stirring the resultant reaction mixture at room temperature for 10 hours. From here, in the same manner as in Example 1, the synthesis was performed.

Figure 7:
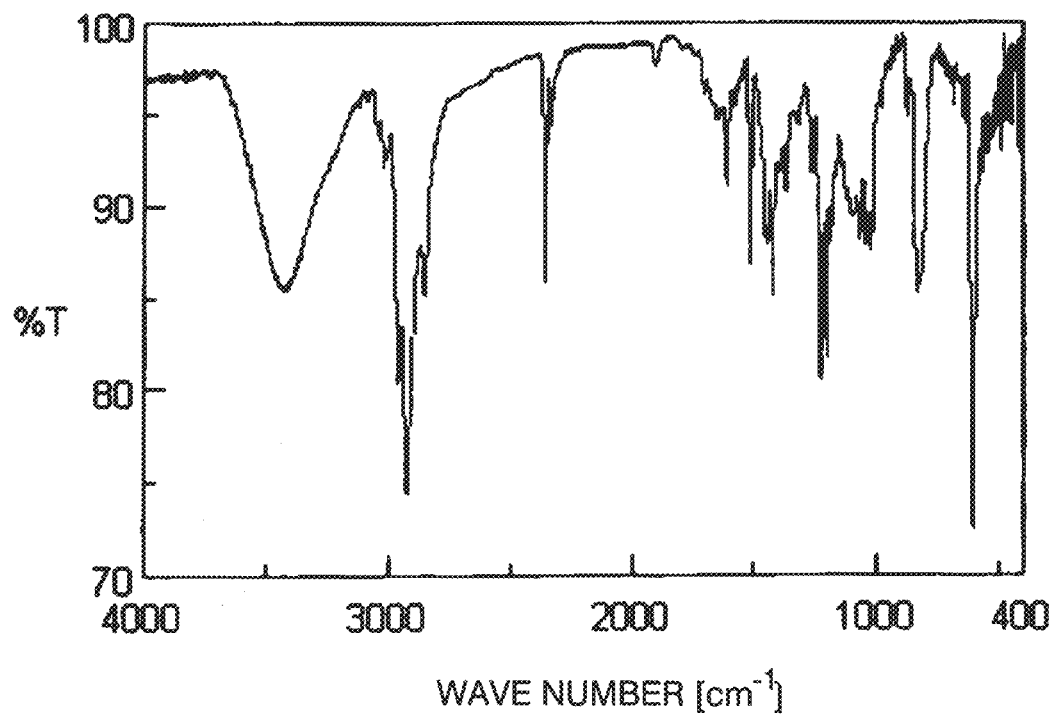
FIG. 7 shows IR spectrum of HPS-N(isopropyl)$_2$ C$_2$H$_4$OHBr obtained in Example 4.

The measurement result of IR spectrum of the obtained HPS-N(Isopropyl)$_2$C$_2$H$_4$OHBr is shown in FIG. 7.

Example 5

2-(dibutylamino)ethanol

HPS-Br (50 mg, 0.25 mmol) was charged into a 10 mL two-neck flask and the inside of the flask was purged with nitrogen. Thereto, 3 mL of THF [manufactured by Kanto Chemical Co., Inc.] was added and further, 2-(dibutyl)aminoethanol (43 mg, 0.25 mmol) [manufactured by Tokyo Chemical Industry Co., Ltd.] was added, followed by stirring the resultant reaction mixture at room temperature for 10 hours. From here, in the same manner as in Example 1, the synthesis was performed.

Figure 8:
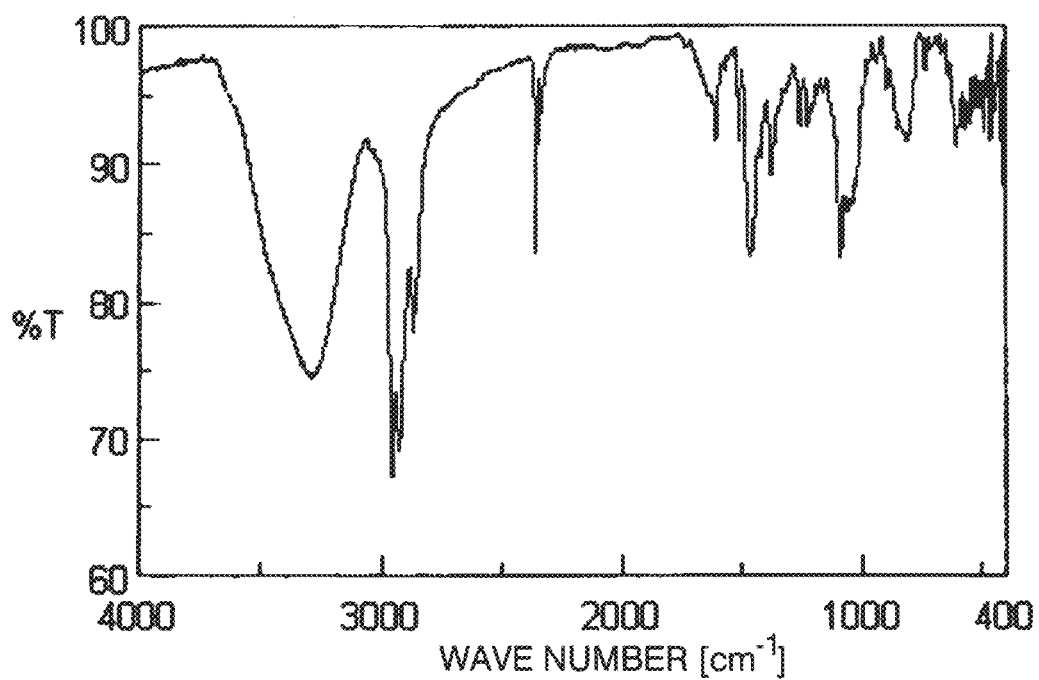
FIG. 8 shows IR spectrum of HPS-N (butyl)$_2$C$_2$H$_4$OHBr obtained in Example 5.

The measurement result of IR spectrum of the obtained HPS-N(Butyl)$_2$C$_2$H$_4$OHBr is shown in FIG. 8.

Example 6

N-lauryldiethanolamine

HPS-Br (50 mg, 0.25 mmol) was charged into a 10 mL two-neck flask and the inside of the flask was purged with nitrogen. Thereto, 3 mL of THF [manufactured by Kanto Chemical Co., Inc.] was added and further, N-lauryldiethanolamine (68 mg, 0.25 mmol) [manufactured by Tokyo Chemical Industry Co., Ltd.] was added, followed by stirring the resultant reaction mixture at 50° C. for 10 hours. From here, in the same manner as in Example 1, the synthesis was performed.

Figure 9:
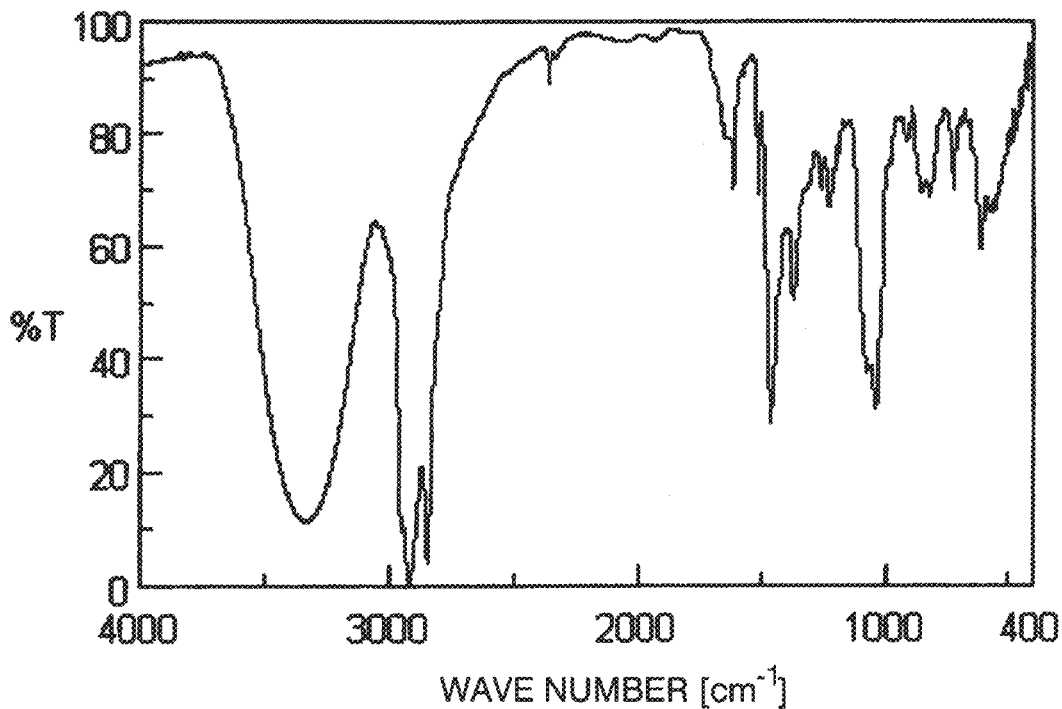
FIG. 9 shows IR spectrum of HPS-N(lauryl)$_2$C$_2$H$_4$OHBr obtained in Example 6.
Figure 10:
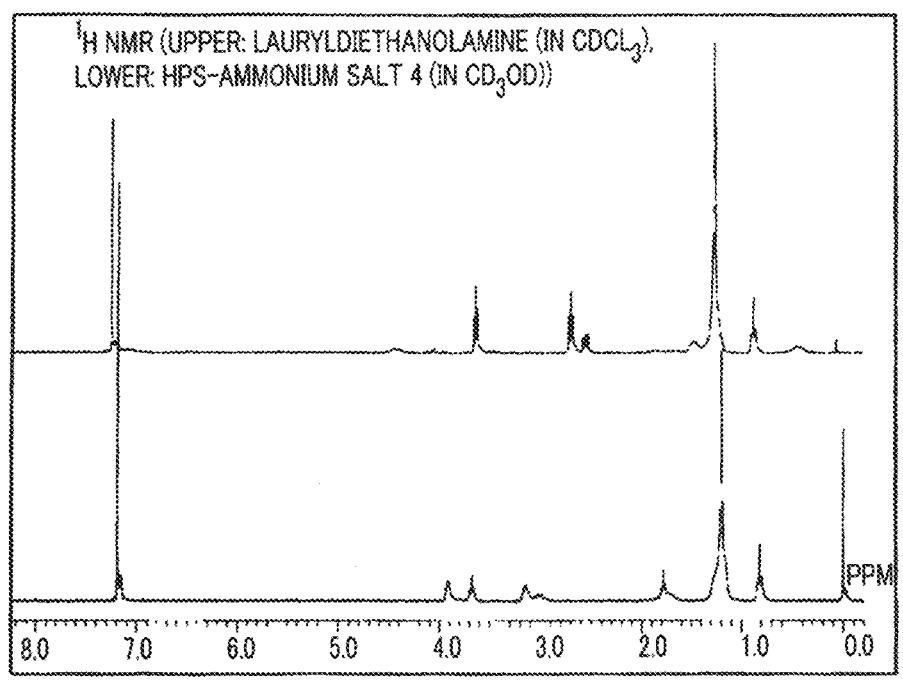
FIG. 10 shows NMR spectrum of HPS-N(lauryl) (C$_2$H$_4$OH)$_2$Br obtained in Example 6.

The measurement results of IR spectrum and NMR spectrum of the obtained HPS-N(Lauryl)(C$_2$H$_4$OH)$_2$Br are shown in FIG. 9 and FIG. 10, respectively.

Example 7

Triethanolamine

HPS-Br (50 mg, 0.25 mmol) was charged into a 10 mL two-neck flask and the inside of the flask was purged with nitrogen. Thereto, 2 mL of toluene [manufactured by Kanto Chemical Co., Inc.], 1 mL of acetonitrile [manufactured by Kanto Chemical Co., Inc.], and triethanolamine (37 mg, 0.25 mmol) [manufactured by Tokyo Chemical Industry Co., Ltd.] were added in this order and the resultant reaction mixture was stirred at 50° C. for 10 hours. From here, in the same manner as in Example 1, the synthesis was performed.

Figure 11:
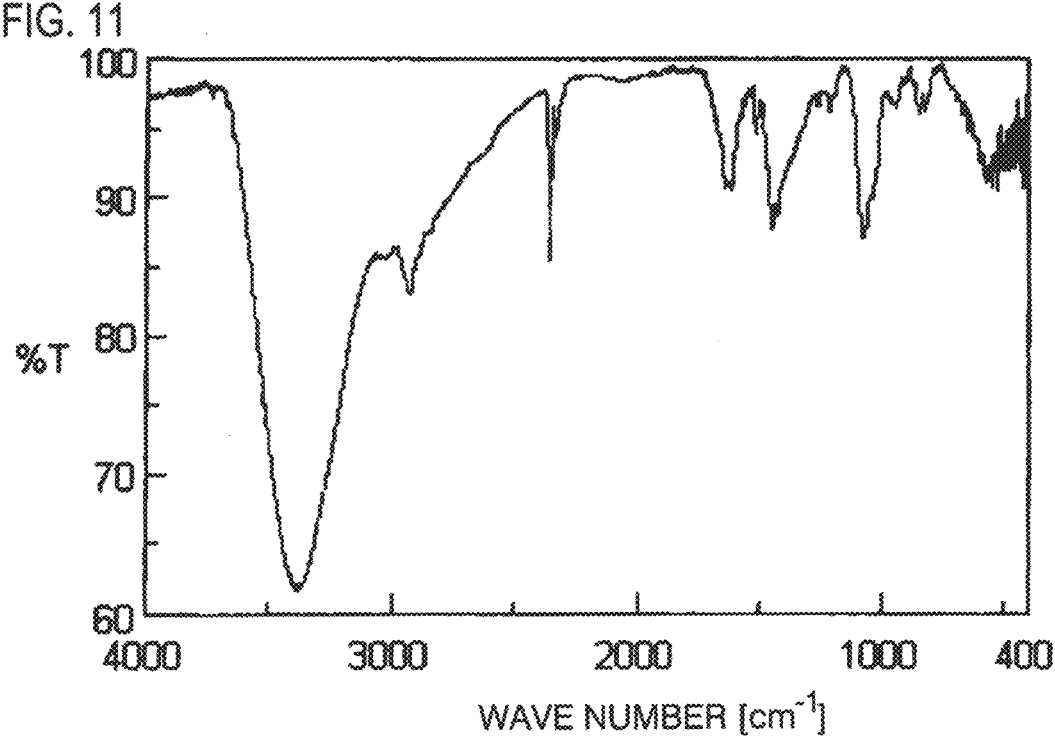
FIG. 11 shows IR spectrum of HPS-N(C$_2$H$_4$OH)$_3$Br obtained in Example 7.

The measurement result of IR spectrum of the obtained HPS-N(C$_2$H$_4$OH)$_3$Br is shown in FIG. 11.

Example 8

2-(2-(dimethylamino)ethoxy)ethanol

HPS-Br (50 mg, 0.25 mmol) was charged into a 10 mL two-neck flask and the inside of the flask was purged with nitrogen. Thereto, 3 mL of THF [manufactured by Kanto Chemical Co., Inc.] was added and further, 2-(2(dimethylamino)ethoxy)ethanol (33 mg, 0.25 mmol) [manufactured by Tokyo Chemical Industry Co., Ltd.] was added, followed by stirring the resultant reaction mixture. From here, in the same manner as in Example 1, the synthesis was performed.

Figure 12:
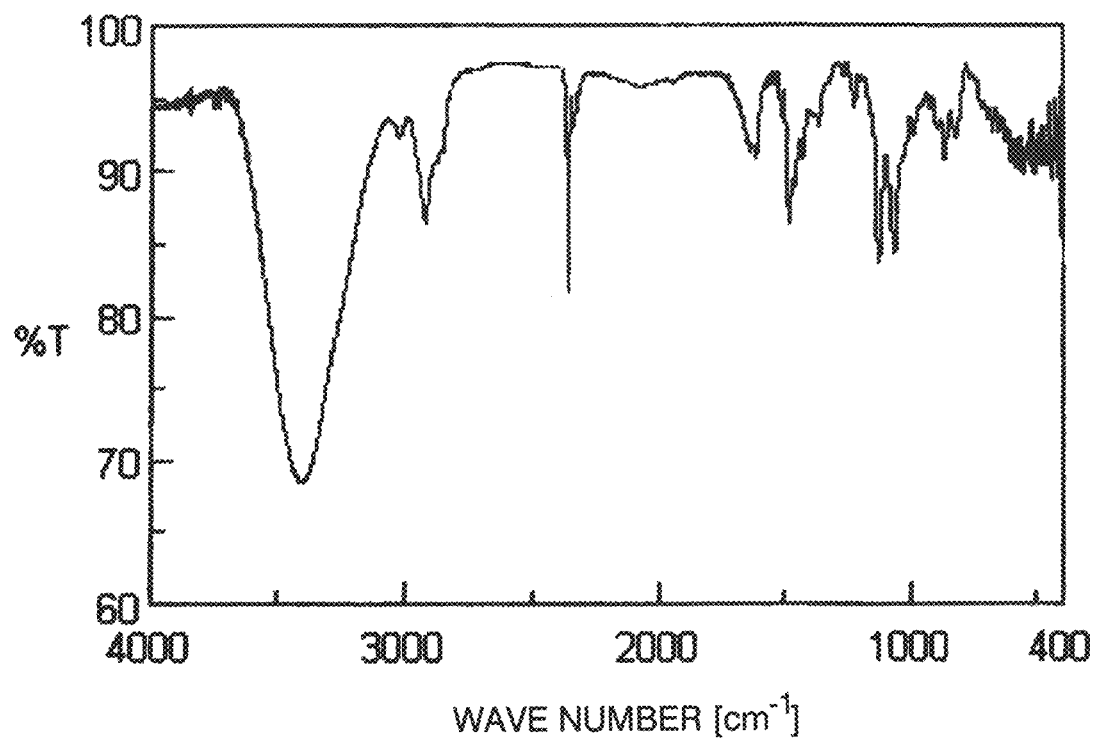
FIG. 12 shows IR spectrum of HPS-N(CH$_3$)$_2$(C$_2$ H$_4$OC$_2$H$_4$OH)Br obtained in Example 8.

The measurement result of IR spectrum of the obtained HPS-N(CH$_3$)$_2$(C$_2$H$_4$OC$_2$H$_4$OH)Br is shown in FIG. 12.

Example 9

Triethylamine

HPS-Br (295 g, 1.5 mmol) was charged into a 25 mL two-neck flask and the inside of the flask was purged with nitrogen. Thereto, DMF [manufactured by Kanto Chemical Co., Inc.] (10 mL) was added and further, triethylamine (306 mg, 3 mmol) [manufactured by TCI] was added, followed by stirring the resultant reaction mixture at 40° C. for 6 hours. The resultant reaction solution was subjected to a re-precipitation purification using diisopropyl ether [manufactured by Junsei Chemical Co., Ltd.] (50 mL) and the resultant precipitate was filtered and vacuum-dried to obtain a yellow-brown solid 92% (412 mg) of HPS-N(Ethyl)$_3$Br.

Example 10

Tributylamine

HPS-Br (296 mg, 1.5 mmol) was charged into a 25 mL two-neck flask and the inside of the flask was purged with nitrogen. Thereto, DMF [manufactured by Kanto Chemical Co., Inc.] (10 mL) was added and further, tributylamine [manufactured by Kanto Chemical Co., Inc.] (556 mg, 3 mmol) was added, followed by stirring the resultant reaction mixture at 40° C. for 6 hours. The resultant reaction solution was subjected to a re-precipitation purification using diisopropyl ether [manufactured by Junsei Chemical Co., Ltd.] (50 mL) and the resultant precipitate was filtered and vacuum-dried to obtain a yellow-brown solid 96% (551 mg) of HPS-N(Butyl)$_3$Br.

Example 11

Trihexylamine

HPS-Br (296 mg, 1.5 mmol) was charged into a 25 mL two-neck flask and the inside of the flask was purged with nitrogen. Thereto, DMF [manufactured by Kanto Chemical Co., Inc.] (10 mL) was added and further, trihexylamine [manufactured by Alfa Aesar] (808 mg, 3 mmol) was added, followed by stirring the resultant reaction mixture at 40° C. for 6 hours. The resultant reaction solution was subjected to a re-precipitation purification using diisopropyl ether [manufactured by Junsei Chemical Co., Ltd.] (50 mL) and the resultant precipitate was filtered and vacuum-dried to obtain a yellow-brown solid 94% (658 mg) of HPS-N(Hexyl)$_3$Br.

[Solubility Evaluation of HPSNR$_3$Br]

Example 12

Solubility Evaluation of HPS-N(C$_2$H$_4$OC$_2$H$_4$OMe)$_3$Br Prepared in Example 2

By adding HPS-N(C$_2$H$_4$OC$_2$H$_4$OMe)$_3$Br (10 mg) to each (1 mL) of the solvents described in Table 1, evaluation of the solubility in each solvent was performed. The result thereof is shown in Table 1.

The compound that was dissolved is evaluated with A; the compound that had low solubility is evaluated with B; and the compound that was not dissolved is evaluated with C.

TABLE 1

| Solvent | Evaluation |
|---|---|
| THF | B |
| Methanol | A |
| Ethanol | A |
| Water | A |
| Chloroform | A |
| Acetone | A |
| Acetonitrile | A |

Example 13

Solubility Evaluation of HPS-(Lauryl)(C$_2$H$_4$OH)$_2$Br Prepared in Example 6

By adding HPS-NR$_3$Br (10 mg) to each (1 mL) of the solvents described in Table 2, evaluation of the solubility in each solvent was performed. The result thereof is shown in Table 2.

The compound that was dissolved is evaluated with A; the compound that had low solubility is evaluated with B; and the compound that was not dissolved is evaluated with C.

TABLE 2

| Solvent | Evaluation |
|---|---|
| Ethanol | A |
| Chloroform | A |

Example 14

Solubility Evaluation of HPS-NR$_3$Br Prepared in Examples 9 and 10

By charging HPS-NR$_3$Br (10 mg) prepared in Examples 9 and 10 into a vial (4 mL) and adding water (1 g) thereto, evaluation of the solubility of each compound was performed. The result thereof is shown in Table 3.

TABLE 3

| | Evaluation |
|---|---|
| R = ethyl | A |
| R = n-butyl | A |

[Formation of Complex of Branched Polymer Compound Having Ammonium Group with Metal Fine Particle]

Example 15

Ligand Exchanging Method

Pd(OAc)$_2$ (23.9 mg) and N(Octyl)$_3$Br (22.2 mg) were charged into a 20 mL Schlenk reaction tube and the inside of the tube was purged with nitrogen. Thereto, 10 mL of tetrahydrofuran was added and the inside of the system was purged with hydrogen. The resultant reaction solution was stirred at room temperature for 12 hours and thereto, HPS-NMe$_2$OctylBr (71.5 mg) was added, followed by stirring the reaction mixture at 60° C. over one night.

Figure 13:
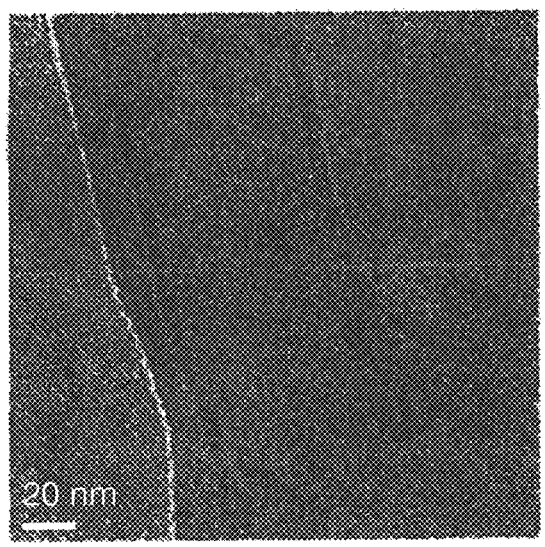
FIG. 13 shows a TEM image of an [HPS-NMe$_2$OctylBr] Pd particle complex obtained in Example 15.

To the resultant reaction solution, 5 ml of water deaerated with argon was added to subject the reaction solution to re-precipitation purification and the resultant precipitate was filtered and dried under reduced pressure to obtain 80 mg of a black precipitate of an [HPS-NMe$_2$OctylBr]Pd particle complex. An image of the obtained black precipitate observed under TEM is shown in FIG. 13. By the TEM observation, the particle diameter of Pd was found to be 5 nm.

Example 16

Direct Hydrogenation Method

HPS-NMe$_2$OctylBr (35 mg, 0.1 mmol) and Pd(OAc)$_2$ (22.4 mg, 0.05 mmL) were charged into a 20 mL two-neck flask and the inside of the flask was purged with nitrogen, followed by adding 5 mL of THF thereto. The inside of the system was purged with hydrogen and the resultant reaction solution was stirred at room temperature over one night.

Figure 14:
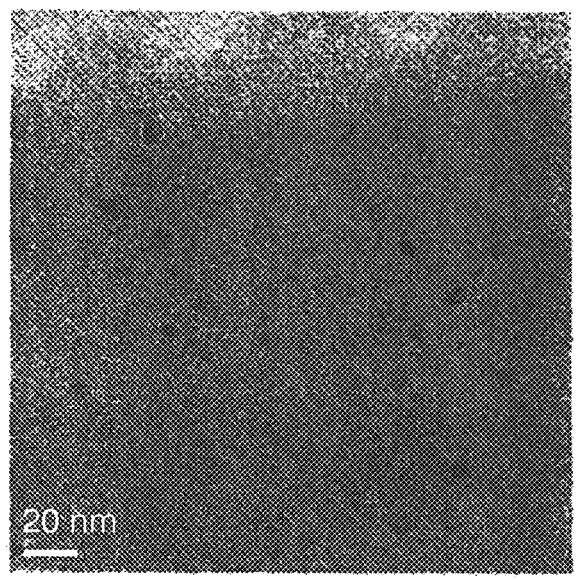
FIG. 14 shows a TEM image of an [HPS-NMe$_2$OctylBr] Pd particle complex obtained in Example 16.

To the resultant reaction solution, 5 ml of water deaerated with argon was added to subject the reaction solution to re-precipitation purification and the resultant precipitate was filtered and dried under reduced pressure to obtain a black precipitate (31.5 mg) of an [HPS-NMe$_2$OctylBr]Pd particle complex. An image of the obtained black precipitate observed under TEM is shown in FIG. 14. By the TEM observation, the particle diameter of Pd was found to be 5 nm.

Example 17

Direct Hydrogenation Method

A methanol solution (5 mL) of HPS-N(C$_2$H$_4$OC$_2$H$_4$OCH$_3$)$_3$Br (282 mg) and Pt(DBA)$_2$ were charged into a 50 mL two-neck flask and the inside of the flask was purged with nitrogen, followed by adding 15 mL of THF thereto. The inside of the system was purged with hydrogen and the resultant reaction solution was stirred at room temperature for 12 hours.

The resultant reaction solution was filtered and the resultant filtrate was evaporated to dryness under reduced pressure, followed by washing the resultant dried substance with hexane to obtain 274 mg of a black solid of an [HPS-N(C$_2$H$_4$OC$_2$H$_4$OCH$_3$)$_3$Br]Pt particle complex.

Example 18

Direct Hydrogenation Method

HPS-NMe$_2$OctylBr (70 mg, 0.2 mmol) and Pd$_2$[(DBA)$_3$(CHCl$_3$)] (103.3 mg, 0.1 mmol) were charged into a 20 mL two-neck flask and the inside of the flask was purged with nitrogen, followed by adding 2 mL of THF thereto. The inside of the system was purged with hydrogen and the resultant reaction solution was stirred at room temperature over one night.

To the resultant reaction solution, 1 ml of water deaerated with argon was added to subject the reaction solution to re-precipitation purification and the resultant precipitate was filtered and dried under reduced pressure to obtain 68.4 mg of a black precipitate of an [HPS-NMe$_2$OctylBr]Pd particle complex. The obtained solid was found to be insoluble in an organic solvent.

Example 19

Direct Hydrogenation Method

HPS-NMe$_2$OctylBr (18 mg, 0.2 mmol) and Pt(DBA)$_2$ (66 mg, 0.1 mmol) were charged into a 20 mL two-neck flask and the inside of the flask was purged with nitrogen, followed by adding 2 mL of THF thereto. The inside of the system was purged with hydrogen and the resultant reaction solution was stirred at room temperature over one night.

To the resultant reaction solution, 1 ml of water deaerated with argon was added to subject the reaction solution to re-precipitation purification and the resultant precipitate was filtered and dried under reduced pressure to obtain 65 mg of a black precipitate of an [HPS-NMe$_2$OctylBr]Pt particle complex. The obtained solid was found to be insoluble in an organic solvent.

Example 20

Direct Hydrogenation Method

Figure 15:
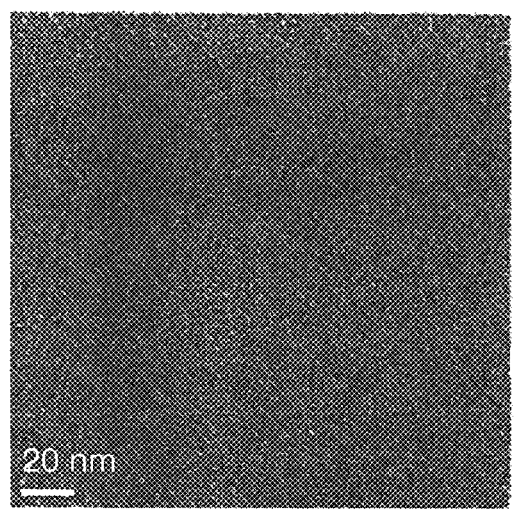
FIG. 15 shows a TEM image of an [HPS-N(Octyl)$_3$Br] Pd particle complex obtained in Example 20.

HPS-N(Octyl)$_3$Br (111.8 mg, 0.2 mmol) and Pd(OAc)$_2$ (87.9 mg, 0.4 mmL) were charged into a 20 mL two-neck flask and the inside of the flask was purged with nitrogen, followed by adding 5 mL of THF thereto. The inside of the system was purged with hydrogen and the resultant reaction solution was stirred at room temperature over one night. The resultant reaction solution was filtered with a membrane filter and from the reaction solution, the solvent was distilled off. The resultant residue was re-dispersed in 10 mL of THF and the resultant dispersion was subjected to re-precipitation purification using 50 mL of hexane [manufactured by Kanto Chemical Co., Inc.]. The resultant precipitate was filtered and vacuum-dried to obtain 131.3 mg of a black solid of an [HPS-N(Octyl)$_3$Br]Pd particle complex. An image of the obtained black solid observed under TEM is shown in FIG. 15. By the TEM observation, the particle diameter was found to be 2.3 nm.

Example 21

Direct Hydrogenation Method

Figure 16:
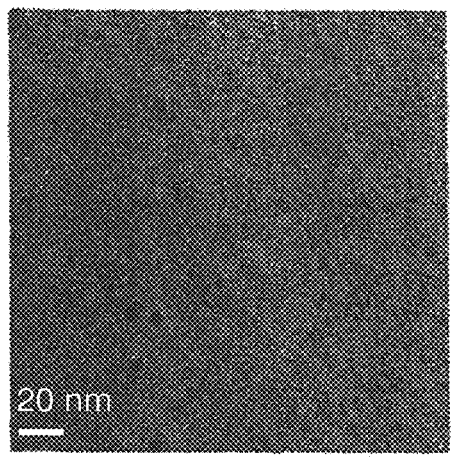
FIG. 16 shows a TEM image of an [HPS-N(Octyl)$_3$Br] Pd particle complex obtained in Example 21.

HPS-N(Octyl)$_3$Br (55.1 mg, 0.1 mmol) and Pd$_2$[(DBA)$_3$(CHCl$_3$)] (33.5 mg, 0.4 mmL) were charged into a 20 mL two-neck flask and the inside of the flask was purged with nitrogen, followed by adding 5 mL of THF thereto. The inside of the system was purged with hydrogen and the resultant reaction solution was stirred at room temperature over one night. To the resultant reaction solution, 5 ml of water deaerated with argon was added to subject the reaction solution to re-precipitation purification and the resultant precipitate was filtered and dried under reduced pressure to obtain 80 mg of a black precipitate of an [HPS-N(Octyl)$_3$Br]Pd particle complex. The Pd content was measured by ICP-MASS and found to be 15% by mass. An image of the obtained black precipitate observed under TEM is shown in FIG. 16. By the TEM observation, the fine particle diameter was found to be 5 nm.

Example 22

Direct Hydrogenation Method

Figure 17:
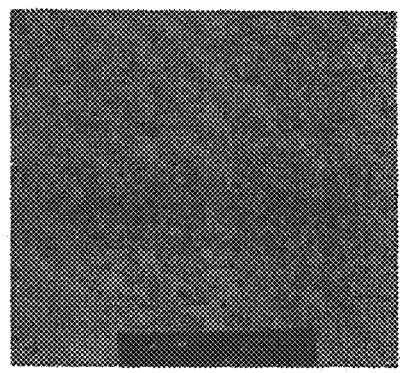
FIG. 17 shows a TEM image of an [HPS-N(Octyl)$_3$Br] Pt particle complex obtained in Example 22.

HPS-N(Octyl)$_3$Br (27.8 mg, 0.05 mmol) and Pt(DBA)$_2$ (65.2 mg, 0.1 mmL) were charged into a 20 mL two-neck flask and the inside of the flask was purged with nitrogen, followed by adding 5 mL of THF thereto. The inside of the system was purged with hydrogen and the resultant reaction solution was stirred at room temperature over one night. To the resultant reaction solution, 2 mL of water deaerated with argon was added to subject the reaction solution to re-precipitation purification and the resultant precipitate was filtered and dried under reduced pressure to obtain 60 mg of a black precipitate of an [HPS-N(Octyl)$_3$Br]Pt particle complex. The Pt content was measured by ICP-MASS and found to be 10% by mass. An image of the obtained black precipitate observed under TEM is shown in FIG. 17. By the TEM observation, the fine particle diameter was found to be 2 nm.

Example 23

Direct Hydrogenation Method

HPS-N(Dodecyl)$_3$Br (179 mg, 0.25 mmol) and Pt(DBA)$_2$ (330 mg, 0.5 mmL) were charged into a 20 mL two-neck flask and the inside of the flask was purged with nitrogen, followed by adding 10 mL of THF thereto. The inside of the system was purged with hydrogen and the resultant reaction solution was stirred at room temperature over one night. The resultant reaction solution was filtered with a membrane filter and from the reaction solution, the solvent was distilled off. The resultant residue was re-dispersed in 10 mL of THF and the resultant dispersion was subjected to re-precipitation purification using 50 mL of hexane [manufactured by Kanto Chemical Co., Inc.]. The resultant precipitate was filtered and vacuum-dried to obtain a black solid (143 mg) of an [HPS-N(Dodecyl)$_3$Br]Pt particle complex. The Pt content was measured by ICP-MASS and found to be 6% by mass.

[Hydrogenation of Stilbene Using Complex]

Example 24

Hydrogenation Reaction of Stilbene

Into a 30 mL two-neck flask, a methanol solution (0.04 g/L, 70 µL) of the [HPS-N(C$_2$H$_4$OC$_2$H$_4$OCH$_3$)$_3$Br]Pt particle complex prepared in Example 17 and 180 mg of trans-stilbene were charged and thereto, 2 mL of methanol was added. The inside of the system was purged with hydrogen and the reaction was effected at room temperature for 11 hours. A dibenzyl derived from reduction of trans-stilbene was obtained in a yield measured by G.C. of 93%.

Example 25

Hydrogenation Reaction of Stilbene

Into a 30 mL two-neck flask, the [HPS-NMe$_2$OctylBr]Pd particle complex (30 mg) prepared according to Example 18 and trans-stilbene [manufactured by Tokyo Chemical Industry Co., Ltd.] (180 mg, 1 mmol) were charged and the inside of the flask was purged with hydrogen, followed by stirring the resultant reaction mixture at room temperature for 24 hours. A dibenzyl in which only an olefin of trans-stilbene was reduced was obtained in a yield measured by G.C. of 68%.

Example 26

Hydrogenation Reaction of Stilbene

Into a 30 mL two-neck flask, the [HPS-N(Octyl)$_3$Br]Pd particle complex (30 mg) prepared according to Example 21 and trans-stilbene [manufactured by Tokyo Chemical Industry Co., Ltd.] (180 mg, 1 mmol) were charged and the inside of the flask was purged with hydrogen, followed by stirring the resultant reaction mixture at room temperature for 24 hours. A dibenzyl in which only an olefin of trans-stilbene was reduced was obtained in a yield measured by G.C. of >99%.

Example 27

Into a 30 mL two-neck flask, the [HPS-NMe$_2$OctylBr]Pt particle complex (30 mg) prepared according to Example 19 and trans-stilbene [manufactured by Tokyo Chemical Industry Co., Ltd.] (180 mg, 1 mmol) were charged and the inside of the flask was purged with hydrogen, followed by stirring the resultant reaction mixture at room temperature for 24 hours. A dibenzyl in which only an olefin of trans-stilbene was reduced was obtained in a yield measured by G.C. of 90% and dicyclohexylethane in which a phenyl group of trans-stilbene was also reduced was obtained in a yield measured by G.C. of 10%.

Example 28

Into a 30 mL two-neck flask, the [HPS-N(Octyl)$_3$Br]Pt particle complex (30 mg) prepared according to Example 22 and trans-stilbene [manufactured by Tokyo Chemical Industry Co., Ltd.] (180 mg, 1 mmol) were charged and the inside of the flask was purged with hydrogen, followed by stirring the resultant reaction mixture at room temperature for 24 hours. A dibenzyl in which only an olefin of trans-stilbene was reduced was obtained in a yield measured by G.C. of 95% and dicyclohexylethane in which a phenyl group of trans-stilbene was also reduced was obtained in a yield measured by G.C. of 5%.

Example 29

Study on Metal Atom Stabilizing Amount Per One Functional Group

HPS-N(Octyl)$_3$Br (27 mg, 0.05 mmol) and each of Pd$_2$[(DBA)$_3$(CHCl$_3$)] (2, 4, 6, and 8 equivalents) were charged into a 20 mL two-neck flask and the inside of the flask was purged with nitrogen, followed by adding 15 mL of THF to the resultant reaction mixture. Inside of the system was purged with hydrogen and the reaction mixture was stirred at room temperature over one night. To each of the obtained reaction solutions, 5 mL of water deaerated with argon was added to subject the reaction solution to re-precipitation purification and the resultant precipitate was filtered and dried under reduced pressure to obtain a black precipitate of an [HPS-N(Octyl)$_3$Br]Pd particle complex. Further, by ICP-Mass, the metal content of each complex was measured. The result thereof is shown in Table 4.

TABLE 4

|  | Pd2(DBA)3CHCl3 | | | |
| --- | --- | --- | --- | --- |
| Additive amount of metal atom (mmol) | 0.1 | 0.2 | 0.3 | 0.4 |
| ICP (% by mass) | 15 | 23 | 23 | 38 |

Figure 18:
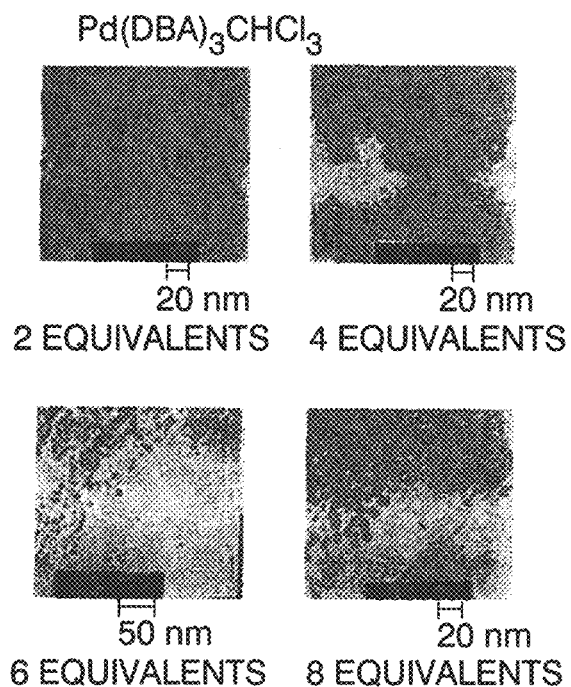
FIG. 18 shows TEM images of [HPS-N(Octyl)$_3$Br] Pd particle complexes obtained using a metal adding amount of 2 equivalents, 4 equivalents, 6 equivalents, and 8 equivalents in Example 29.

An image of the obtained black precipitate observed under TEM is shown in FIG. 18. By the TEM observation, it was found that all particle diameters of the obtained complexes were 5 nm irrelevantly to the additive amount of a metal atom.

Example 30

Study on Additive Amount and Stabilizing Amount of Metal

HPS-N(Octyl)$_3$Br (27 mg, 0.1 mmol) and each of Pt(DBA)$_2$ (2, 4, 6, and 8 equivalents) were charged into a 20 mL two-neck flask and the inside of the flask was purged with nitrogen, followed by adding 15 mL of THF to the resultant reaction mixture. Inside of the system was purged with hydrogen and the reaction mixture was stirred at room temperature over one night. To each of the obtained reaction solutions, 5 mL of water deaerated with argon was added to subject the reaction solution to re-precipitation purification and the resultant precipitate was filtered and dried under reduced pressure to obtain a black precipitate of an [HPS-N(Octyl)$_3$Br]Pt particle complex. Further, by ICP-Mass, the metal content was measured. The result thereof is shown in Table 5.

TABLE 5

|  | Pt(DBA)2 | | | |
| --- | --- | --- | --- | --- |
| Additive amount of metal (mmol) | 0.2 | 0.4 | 0.6 | 0.8 |
| ICP (% by mass) | 9 | 11 | 12 | 27 |

Figure 19:
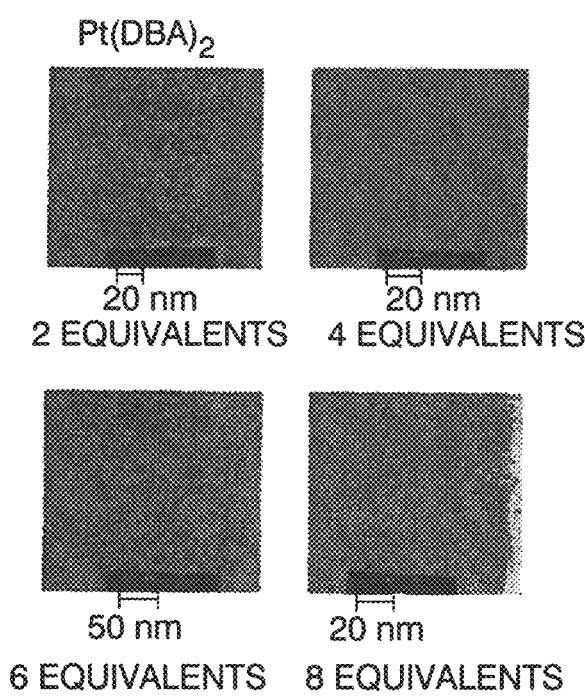
FIG. 19 shows TEM images of [HPS-N(Octyl)$_3$Br] Pt particle complexes obtained using a metal adding amount of 2 equivalents, 4 equivalents, 6 equivalents, and 8 equivalents in Example 30.

An image of the obtained black precipitate observed under TEM is shown in FIG. 19. By the TEM photographing, it was found that all particle diameters of the obtained complexes were 2 nm irrelevantly to the additive amount of a metal atom.

Example 31

Repeated Reuse of Aromatic Compound for Reduction

First use: Into an autoclave, the [HPS-N(Octyl)$_3$Br]Pt particle complex (10 mg, metal content ratio: 6% by mass) prepared according to Example 23 and toluene (460 mg, 5 mmol) were charged and the reaction was effected in a hydrogen atmosphere (10 atm) at 40° C. for 24 hours. The inversion rate of the obtained reaction solution was measured by G.C. and found to be 12% and TON of the catalyst was 3,900. The reaction solution was subjected to re-precipitation purification using hexane and the resultant precipitate was filtered and dried under reduced pressure to obtain 9.6 mg of a black precipitate.

Second use: To the black precipitate of the [HPS-N(Octyl)$_3$Br]Pt particle complex (9.6 mg) obtained in the first use, toluene (460 mg, 5 mmol) was added and the resultant mixture was subjected to the reaction in a hydrogen atmosphere (10 atm) at 40° C. for 24 hours. The inversion rate of the obtained reaction solution was measured by G.C. and found to be 10% and TON of the catalyst was 3,300. The reaction solution was subjected to re-precipitation purification using hexane and the resultant precipitate was filtered and dried under reduced pressure to obtain 9.4 mg of a black precipitate.

Third use: To the black precipitate of the [HPS-N(Octyl)$_3$Br]Pt particle complex (9.4 mg) obtained in the second use, toluene (460 mg, 5 mmol) was added and the resultant mixture was subjected to the reaction in a hydrogen atmosphere (10 atm) at 40° C. for 24 hours. The inversion rate of the obtained reaction solution was measured by G.C. and found to be 11% and TON of the catalyst was 3,600. The reaction solution was subjected to re-precipitation purification using hexane and the resultant precipitate was filtered and dried under reduced pressure to obtain a black precipitate.

Figure 20:
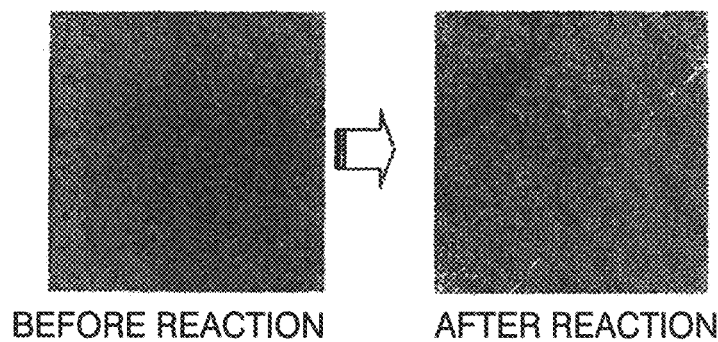
FIG. 20 shows TEM images of black precipitates before and after the reaction in Example 31.

Between before and after the reaction, there was no change in the state of the solution (colloidal solution) and from the result of a TEM observation, it was found that there was no change in the particle diameter thereof either. The result of the TEM observation is shown in FIG. 20.

Examples 32 to 36

Into an autoclave, the [HPS-N(Octyl)$_3$Br]Pt particle complex (1 mg, metal content: 10% by mass) prepared according to Example 22 and each of the various aromatic compounds (1 mmol) described in Table 6 were charged and thereto, 1 mL of THF was added. The reaction was effected in a hydrogen atmosphere (10 atm) at 40° C. for 10 hours.

Comparative Examples 1 to 5

As a comparison relative to Examples 32 to 36, the reaction was effected in the same manner as in Example 32, except that instead of the [HPS-N(Octyl)$_3$Br]Pt particle complex (1 mg, metal content: 10% by mass), 1 mg of Pt/C (metal content: 5% by mass) [manufactured by Wako Pure Chemical Industries, Ltd.] was used.

The results of Examples 32 to 36 and Comparative Examples 1 to 5 are shown in Table 6.

TABLE 6

ArR (1 mmol) + H$_2$ (10 atm) → Cyclohexyl-R, Catalyst, THF (1 mL), 40° C., 10 h

| | Catalyst (mg) | Product | G.C. yield (%) | TON |
|---|---|---|---|---|
| Example 32 | [HPSN$^+$Br$^-$(Octyl)$_3$]$_n$-Pt$_{particle}$ (10% by mass) (1 mg) | Ph-Me → Cy-Me | 66 | 1360 |
| Comparative Example 1 | Pt/C 5% by mass (2 mg) | Ph-Me → Cy-Me | 44 | 580 |
| Example 33 | [HPSN$^+$Br$^-$(Octyl)$_3$]$_n$-Pt$_{particle}$ (10% by mass) (1 mg) | Ph-OMe → Cy-OMe | 58 | 1160 |
| Comparative Example 2 | Pt/C 5% by mass (2 mg) | Ph-OMe → Cy-OMe | 13 | 250 |
| Example 34 | [HPSN$^+$Br$^-$(Octyl)$_3$]$_n$-Pt$_{particle}$ (10% by mass) (1 mg) | Ph-CO$_2$Et → Cy-CO$_2$Et | 52 | 1000 |
| Comparative Example 3 | Pt/C 5% by mass (2 mg) | Ph-CO$_2$Et → Cy-CO$_2$Et | 13 | 250 |

TABLE 6-continued

[Reaction scheme: Ph-R + Catalyst, H₂ (10 atm), THF (1 mL), 40° C., 10 h → cyclohexyl-R; (1 mmol)]

| | Catalyst (mg) | Product | G.C. yeild (%) | TON |
|---|---|---|---|---|
| Example 35 | [HPSN⁺Br⁻(Octyl)₃]ₙ-Pt$_{particle}$ (10% by mass) (1 mg) | | 43 | 820 |
| Comparative Example 4 | Pt/C 5% by mass (2 mg) | PhNH₂ → cyclohexyl-NH₂ | 220 | 381 |
| Example 36 | [HPSN⁺Br⁻(Octyl)₃]ₙ-Pt$_{particle}$ (10% by mass) (1 mg) | | 63 | 1260 |
| Comparative Example 5 | Pt/C 5% by mass (2 mg) | pyridine → piperidine | 14 | 280 |

Examples 37 to 44

Into an autoclave, the [HPS-N(Dodecyl)₃Br]Pt particle complex (5 mg, metal content: 19% by mass) prepared according to Example 23 except that HPS-N(Dodecyl)₃Br and Pt(DBA)₂ in a ratio of 1:1 were charged into the reaction system and each of the various aromatic compounds (3 mmol) described in Table 7 were charged and the reaction was effected in a hydrogen atmosphere (30 atm) for 24 hours.

Comparative Example 6

As a comparison relative to Examples 37 to 44, the reaction was effected in the same manner as in Example 37, except that instead of the [HPS-N(Dodecyl)₃Br]Pt particle complex (5 mg, metal content: 19% by mass), Pt/C (20 mg, metal content: 5% by mass [manufactured by Wako Pure Chemical Industries, Ltd.]) was used.

The results of Examples 37 to 44 and Comparative Example 6 are shown in Table 7.

TABLE 7

[Reaction scheme: Ph-X + [HPS—N⁺Br⁻(Dodecyl)₃Br]-Pt$_{particle}$ (19% by mass) (5 mg), H₂ (30 atm), 24 h → cyclohexyl-X; (3 mmol)]

| | Raw material | Product | G.C. yield | TON |
|---|---|---|---|---|
| Example 37 | Ph-Me | cyclohexyl-Me | >99 | 618 |
| Example 38 | Ph-CO₂Me | cyclohexyl-CO₂Me | 81 | 501 |
| Example 39 | Ph-OMe | cyclohexyl-OMe | 84 | 520 |
| Example 40ᵃ | pyridine | piperidine | 20 | 124 |
| Example 41ᵃ | Ph-NH₂ | cyclohexyl-NH₂ | 6 | 37 |
| Example 42 | Ph-NMe₃ | cyclohexyl-NMe₃ | 4 | 25 |

TABLE 7-continued

| | [HPS—N$^+$Br$^-$(Dodecyl)$_3$Br]- Pt$_{particle}$ (19% by mass) (5 mg) H$_2$ (30 atm) 24 h | | | |
|---|---|---|---|---|
| | Raw material | Product | G.C. yield | TON |
| Example 43$^a$ | PhCH(NH$_2$)CH$_3$ | CyCH(NH$_2$)CH$_3$ | 23 (99% ee) | 155 |
| Example 44 | PhCH(OH)CH$_3$ | CyCH(OH)CH$_3$ | 21 (99% ee) | 130 |

$^a$an acetylated product was measured

Comparative Example 6

PhMe + Pt/C (5% by mass)* (20 mg), H$_2$ (30 atm) → CyMe
*Pt/C (5% by mass). Wake Lot. ASE2866
(3 mmol) (72%) TON = 445

Example 45

Film Formation of an [HPS-N(C$_2$H$_4$OC$_2$H$_4$OCH$_3$)$_3$Br]Pt Fine Particle Complex by Spin-Coating and Ellipsometry A 5% by mass [HPS-N(C$_2$H$_4$OC$_2$H$_4$OCH$_3$)$_3$Br]Pt fine particle complex ethanol solution was spin-coated on a glass substrate of 3 cm×3 cm at 3,000 rpm for 30 seconds and was baked at 80° C. for 10 minutes to obtain a thin film having a homogeneous film thickness. As the result of measuring the refractive index of the obtained thin film using an ellipsometer, it was found that n was 1.61 (wavelength: 598 nm) and the film thickness was 105 nm.

[Preparation of Complex with Particle of Various Metals]

Example 46

[HPS-N(C$_2$H$_4$OC$_2$H$_4$OCH$_3$)$_3$Br]Rh Particle Complex

Into a two-neck eggplant-shaped flask (100 mL) equipped with a water-cooling tube, HPSNBr(C$_2$H$_4$OC$_2$H$_4$OCH$_3$)$_3$ (260 mg) and RhCl$_3$·3H$_2$O [manufactured by Furuya Metal Co., Ltd.] (142 mg) were charged and the inside of the flask was purged with nitrogen. Thereto, further 2-propanol [manufactured by Kanto Chemical Co., Inc.] (30 mL), ethanol [manufactured by Kanto Chemical Co., Inc.] (15 mL), and distilled water (5 mL) were added and the resultant reaction mixture was heating-refluxed at 85° C. for 4 hours. After the reaction, the reaction solution was filtered with a membrane filter and from the resultant filtrate, the solvent was distilled off with a rotary evaporator. The resultant residue was re-dissolved in chloroform [manufactured by Kanto Chemical Co., Inc.] (10 mL) and the resultant solution was dropped into hexane [manufactured by Kanto Chemical Co., Inc.] (30 mL) to subject the solution to re-precipitation purification. A glossy black solid (259 mg) of an [HPSNBr(C$_2$H$_4$OC$_2$H$_4$OCH$_3$)$_3$]Rh particle complex was obtained. By ICP-MASS, an element analysis, and a DTA-TG (differential thermogravimetric analysis-thermogravimetry) measurement, the Rh content was measured (Rh content by ICP-MASS: 22.6% by mass, Rh content by element analysis: 27.6% by mass, Rh content by TG: 22.4% by mass). Element analysis measured value C: 40.16, H: 5.96, N: 1.81, calculated value Br: 11.12, O: 13.37, Rh: 27.6

Figure 21:
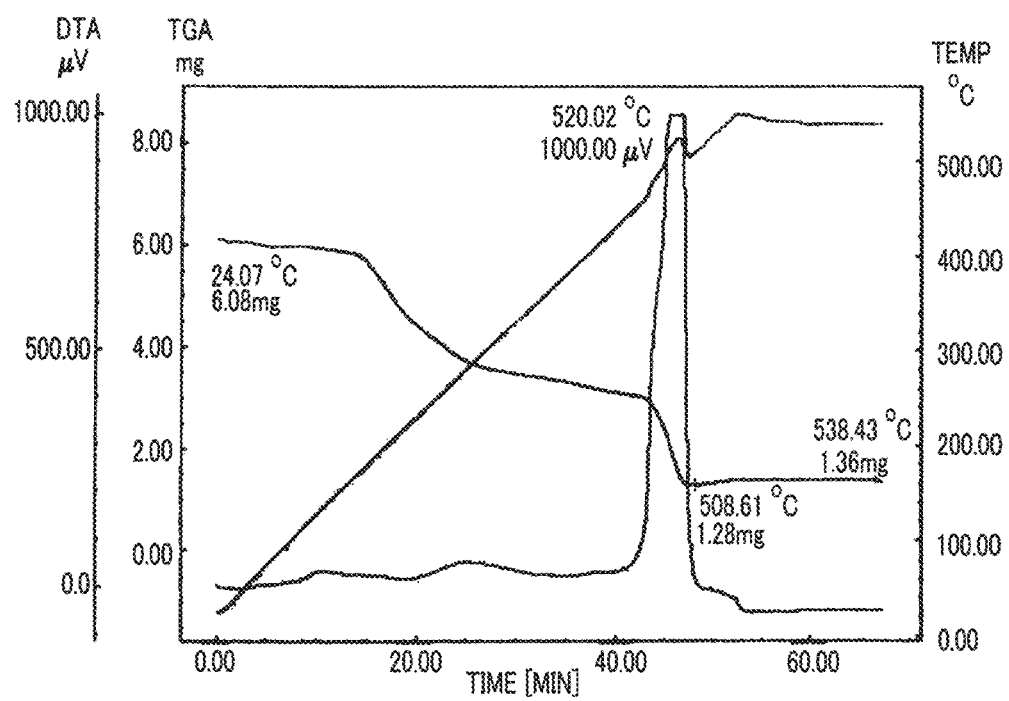
FIG. 21 shows the result of the DTA-TG measurement of a black solid obtained in Example 46.
Figure 22:
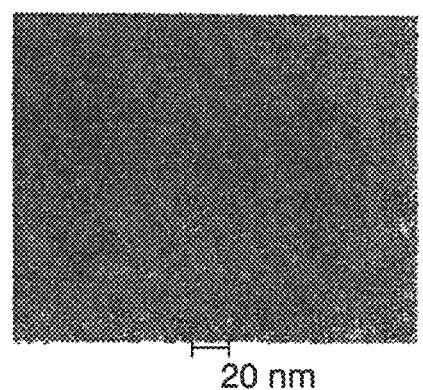
FIG. 22 shows a TEM image of a black solid obtained in Example 46.

The result of the DTA-TG measurement is shown in FIG. 21. An image of the obtained black solid observed under TEM is shown in FIG. 22.

Example 47

[HPSN(C$_2$H$_4$OC$_2$H$_4$OCH$_3$)$_3$Br]Ir Particle Complex

Figure 23:
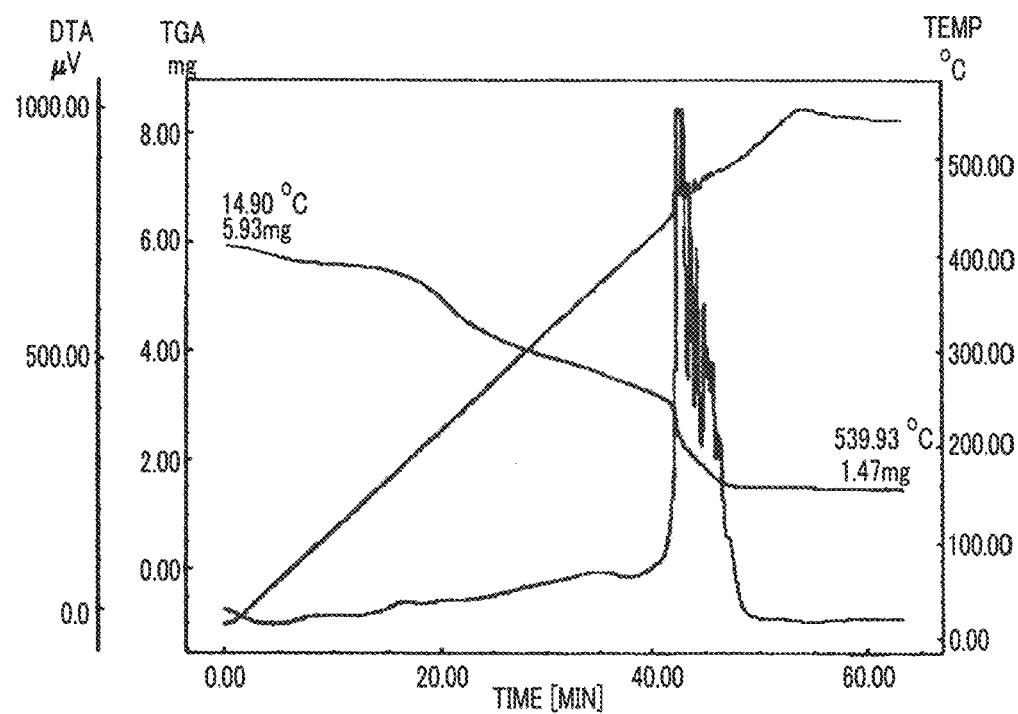
FIG. 23 shows the result of the DTA-TG measurement of an ocher solid obtained in Example 47.
Figure 24:
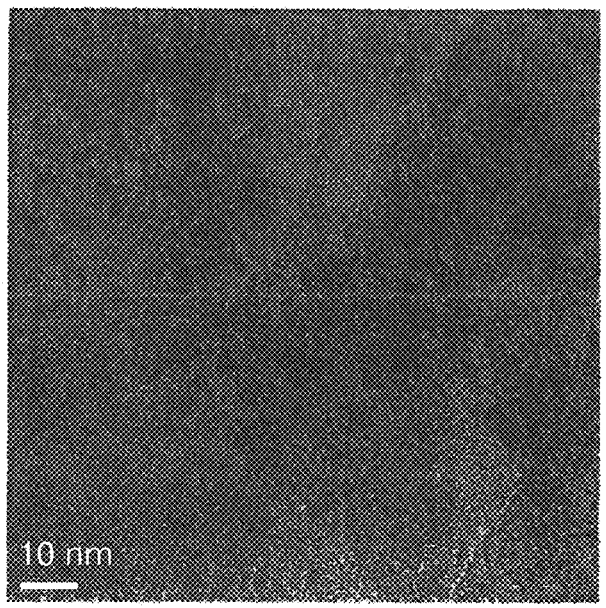
FIG. 24 shows a TEM image of an ocher solid obtained in Example 47.

Into a two-neck flask (100 mL) equipped with a cooling tube, HPSNBr(C$_2$H$_4$OC$_2$H$_4$OCH$_3$)$_3$ (190 mg) and IrCl$_3$·3H$_2$O [manufactured by Furuya Metal Co., Ltd.] (84 mg) were charged and thereto, further ethanol [manufactured by Kanto Chemical Co., Inc.] (15 mL) and distilled water (15 mL) were added, followed by purging the inside of the flask with nitrogen. Under heating-reflux (80° C.), the resultant reaction mixture was stirred for 12 hours. After the reaction, the solution was filtered with a membrane filter and from the resultant filtrate, the solvent was distilled off with a rotary evaporator. The resultant residue was re-dissolved in chloroform [manufactured by Kanto Chemical Co., Inc.] (10 mL) and the resultant solution was dropped into hexane [manufactured by Kanto Chemical Co., Inc.] (30 mL) to subject the solution to re-precipitation purification. An ocher solid (192 mg) of an [HPSNBr(C$_2$H$_4$OC$_2$H$_4$OCH$_3$)$_3$]Ir particle complex was obtained. The Ir content was measured by a DTA-TG measurement and found to be 24.8% by mass. The result of the DTA-TG measurement is shown in FIG. 23. An image of the obtained black solid observed under TEM is shown in FIG. 24.

Example 48

[HPSN(C$_2$H$_4$OC$_2$H$_4$OCH$_3$)$_3$Br]Ag Particle Complex

Figure 25:
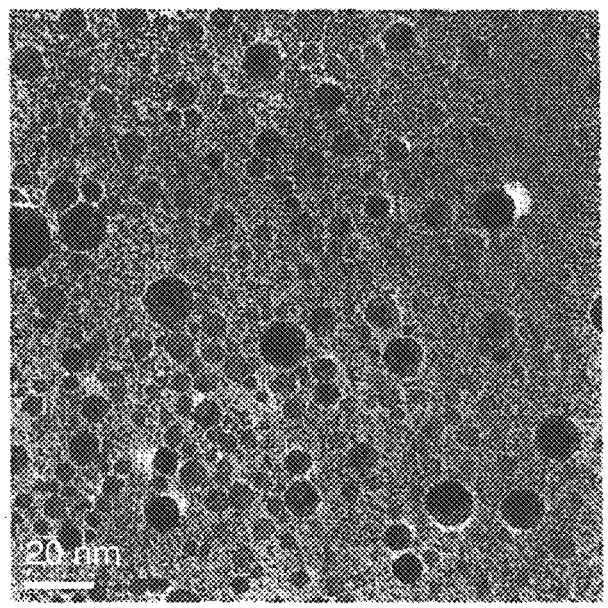
FIG. 25 shows a TEM image of a highly viscous black solid obtained in Example 48.

Into an eggplant-shaped flask (100 mL), HPSNBr(C$_2$H$_4$OC$_2$H$_4$OCH$_3$)$_3$ (190 mg) and Ag$_2$O [manufactured by Kishida Chemical Co., Ltd.] (49 mg) were charged and thereto, ethylene glycol [manufactured by Kanto Chemical Co., Inc.] (10 g) was added, followed by stirring the resultant reaction mixture at 70° C. for 12 hours. Under reduced pressure, ethylene glycol was distilled off at 100° C. The resultant residue was re-dissolved in chloroform [manufactured by Kanto Chemical Co., Inc.] (10 mL) and the resultant solution was dropped into hexane [manufactured by Kanto Chemical Co., Inc.] (30 mL) to subject the solution to re-precipitation purification. A highly viscous black solid (137 mg) of an [HPSNBr(C$_2$H$_4$OC$_2$H$_4$OCH$_3$)$_3$]Ag particle complex was obtained. An image of the obtained black solid observed under TEM is shown in FIG. 25.

Example 49

[HPSN(C$_2$H$_4$OC$_2$H$_4$OCH$_3$)$_3$Br]Au Particle Complex

Figure 26:
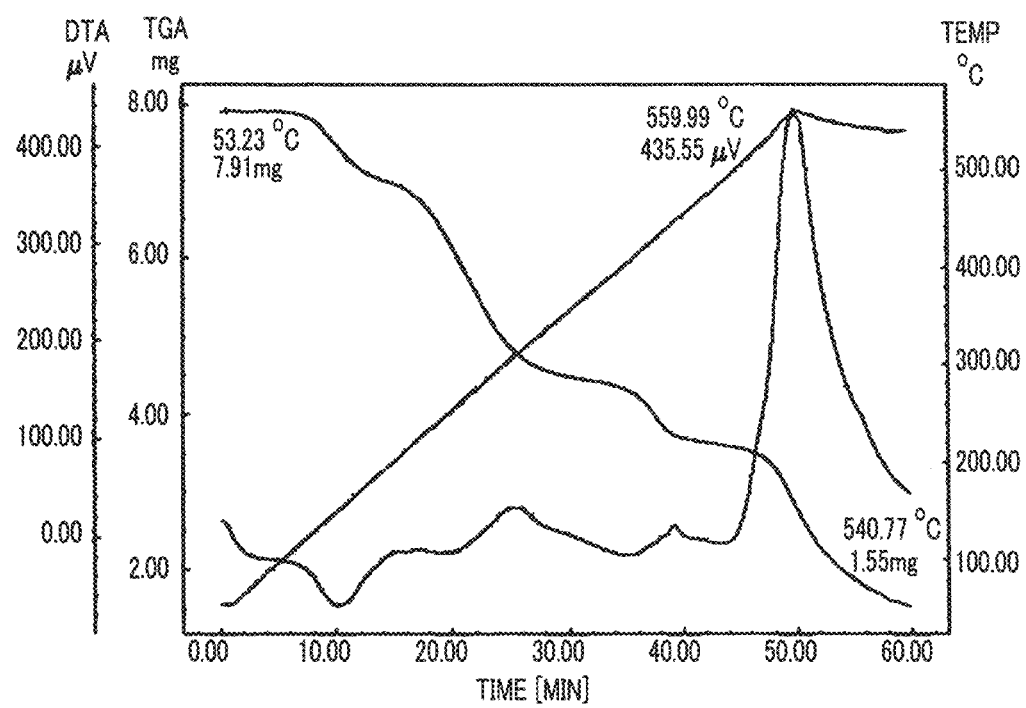
FIG. 26 shows the result of the DTA-TG measurement of a gray viscous solid obtained in Example 49.
Figure 27:
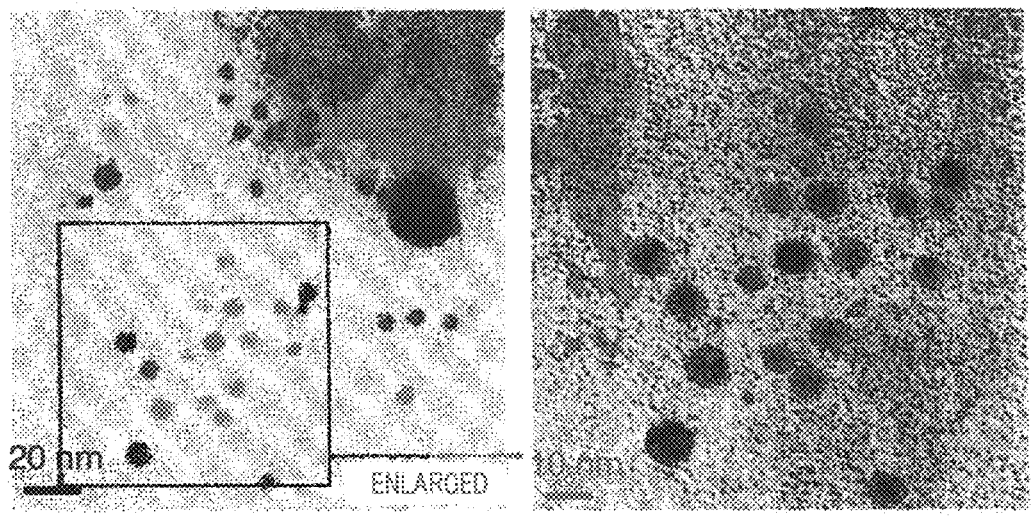
FIG. 27 shows a TEM image of a gray viscous solid obtained in Example 49 and the right photograph is a photograph formed by enlarging the inside of the frame in the left photograph.

Into a two-neck eggplant-shaped flask (100 mL) equipped with a cooling tube, HPSNBr(C$_2$H$_4$OC$_2$H$_4$OCH$_3$)$_3$ (190 mg), HAuCl$_4$·4H$_2$O [manufactured by Kanto Chemical Co., Inc.] (84 mg), and magnesium [manufactured by Kishida Chemical Co., Ltd.] (chip-shaped, 6 mg) were charged and the inside of the flask was purged with nitrogen. Thereto, ethanol [manufactured by Kanto Chemical Co., Inc.] (15 mL) was added and under heating-reflux (80° C.), the resultant reaction mixture was stirred for 12 hours. After the reaction, the solution was filtered with a membrane filter and the resultant filtrate was re-dissolved in chloroform [manufactured by Kanto Chemical Co., Inc.] (10 mL). The resultant solution was dropped into hexane [manufactured by Kanto Chemical Co., Inc.] (30 mL) to subject the solution to re-precipitation purification. A gray viscous solid (231 mg) of an [HPSNBr(C$_2$H$_4$OC$_2$H$_4$OCH$_3$)$_3$]Au particle complex was obtained. The Au content was measured by a DTA-TG measurement and found to be 19.6% by mass. The result of the DTA-TG measurement is shown in FIG. 26. An image of the obtained gray viscous solid observed under TEM is shown in FIG. 27. In FIG. 27, the right photograph is a photograph produced by enlarging the inside of the frame in the left photograph.

Example 50

[HPSN(C$_2$H$_4$OC$_2$H$_4$OCH$_3$)$_3$Br]Pd Particle Complex

Into an eggplant-shaped flask (100 mL), HPSNBr (C$_2$H$_4$OC$_2$H$_4$OCH$_3$)$_3$ (216 mg) was charged and the inside of the flask was purged with nitrogen. Thereto, H$_2$O (20 mL) was added and the resultant reaction mixture was stirred until the mixture became homogeneous to prepare Solution 1.

Separately, Palladium acetate [manufactured by Wako Pure Chemical Industries, Ltd.] (99 mg) was charged into an eggplant-shaped flask (20 mL) and the inside of the flask was purged with nitrogen. Thereto, H$_2$O (10 mL) and THF [manufactured by Kanto Chemical Co., Inc.] (3 mL) were added and the resultant mixture was stirred until the mixture became homogeneous to prepare Solution 2.

Figure 28:
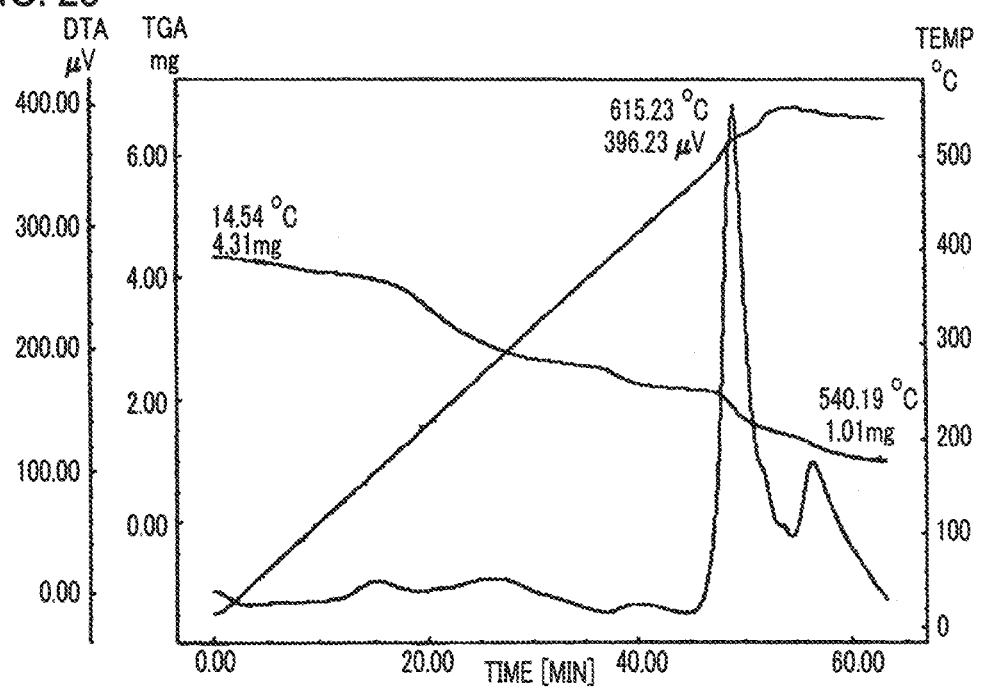
FIG. 28 shows the result of the DTA-TG measurement of a viscous black solid obtained in Example 50.
Figure 29:
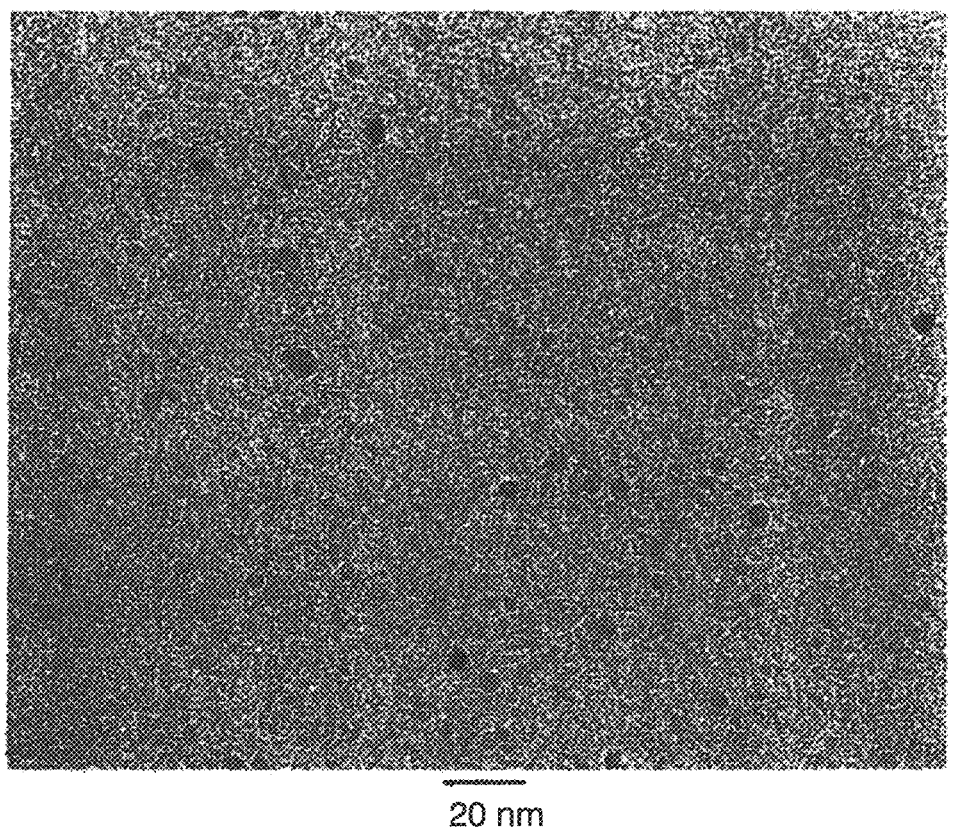
FIG. 29 shows a TEM image of a viscous black solid obtained in Example 50.

Solution 2 was added to the flask of Solution 1 with a syringe and the resultant mixture was stirred at room temperature for 1 hour. To the mixture, ethanol [manufactured by Kanto Chemical Co., Inc.] (10 mL) was added and the resultant reaction mixture was stirred at 70° C. for 15 hours. After the reaction, the solution was filtered with a membrane filter and from the resultant filtrate, the solvent was distilled off with a rotary evaporator. The resultant residue was re-dissolved in chloroform [manufactured by Kanto Chemical Co., Inc.] (10 mL) and the resultant solution was dropped into hexane [manufactured by Kanto Chemical Co., Inc.] (30 mL) to subject the solution to re-precipitation purification. A viscous black solid (222 mg) of an [HPSNBr (C$_2$H$_4$OC$_2$H$_4$OCH$_3$)$_3$]Pd particle complex was obtained. The palladium content was measure by a DTA-TG measurement and was found to be 22% by mass. The result of the DTA-TG measurement is shown in FIG. 28. An image of the obtained viscous black solid observed under TEM is shown in FIG. 29.

Example 51

[HPS-N(C$_2$H$_4$OC$_2$H$_4$OCH$_3$)$_3$Br]Cu Particle Complex

Into an eggplant-shaped flask (100 mL), HPS-N (C$_2$H$_4$OC$_2$H$_4$OCH$_3$)$_3$Br (196 mg), copper (II) acetate dihydrate (118 mg), metal magnesium (8 mg), and methanol (15 mL) were charged and the inside of the flask was purged with nitrogen. The resultant reaction mixture was heating-refluxed at 85° C. for 2 hours. After the reaction, the solution was filtered and the resultant filtrate was evaporated to dryness under reduced pressure. The resultant residue was re-precipitated in chloroform-hexane and the resultant precipitate was retrieved with a membrane filter to obtain a light blue solid (181 mg) of an [HPS-N (C$_2$H$_4$OC$_2$H$_4$OCH$_3$)$_3$Br] Cu particle complex.

Figure 30:
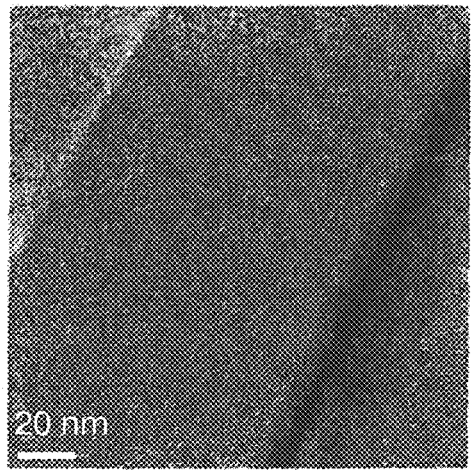
FIG. 30 shows a TEM image of a blue solid obtained in Example 51.

An image of the obtained light blue solid observed under TEM is shown in FIG. 30.

Example 52

[HPS-N(C$_2$H$_4$OC$_2$H$_4$OCH$_3$)$_3$Br]W Particle Complex

Into a two-neck flask (100 mL), HPS-N (C$_2$H$_4$OC$_2$H$_4$OCH$_3$)$_3$Br (192 mg) and W(CO)$_6$ (78 mg) were charged and the inside of the flask was purged with nitrogen, followed by adding 10 mL of tetrahydrofuran thereto. The inside of the system was purged with hydrogen and the resultant reaction mixture was heated and stirred at 70° C. for 24 hours. The reaction mixture was subjected to re-precipitation in chloroform-hexane and the resultant precipitate was retrieved with a membrane filter to obtain a highly viscous brown solid (209 mg) of an [HPS-N (C$_2$H$_4$OC$_2$H$_4$OCH$_3$)$_3$Br]W particle complex.

Figure 31:
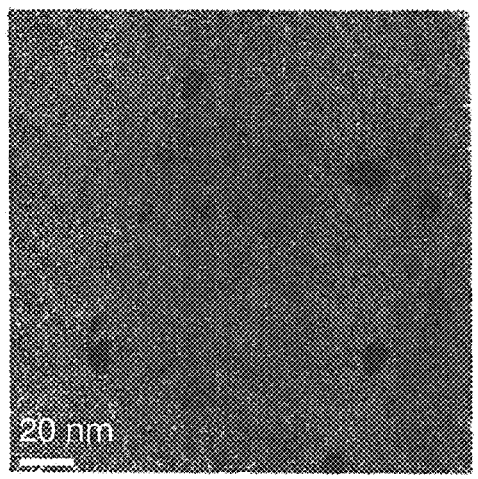
FIG. 31 shows a TEM image of a highly viscous brown solid obtained in Example 52.

An image of the obtained highly viscous brown solid observed under TEM is shown in FIG. 31.

Example 53

[HPS-N(C$_2$H$_4$OC$_2$H$_4$OCH$_3$)$_3$Br]Re Particle Complex

Into a two-neck flask (100 mL), 3 mL of a methanol solution of HPS-N(C$_2$H$_4$OC$_2$H$_4$OCH$_3$)$_3$Br (228 mg) and Re$_2$(CO)$_{10}$ (98 mg) were charged and the inside of the flask was purged with nitrogen, followed by adding 15 mL of toluene thereto. The solution was refluxed at 110° C. for 12 hours and then the solvent was distilled off under reduced pressure. Next, the resultant residue was subjected to re-precipitation in chloroform-hexane and the resultant precipitate was retrieved with a membrane filter to obtain a highly viscous brown solid (175 mg) of an [HPS-N (C$_2$H$_4$OC$_2$H$_4$OCH$_3$)$_3$Br]Re particle complex.

Figure 32:
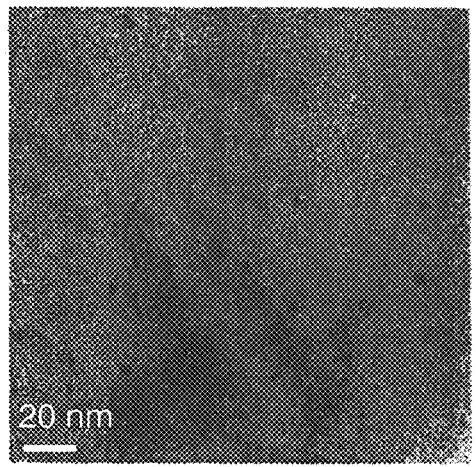
FIG. 32 shows a TEM image of a highly viscous brown solid obtained in Example 53.

An image of the obtained highly viscous brown solid observed under TEM is shown in FIG. 32.

Example 54

[HPS-N(C$_2$H$_4$OC$_2$H$_4$OCH$_3$)$_3$Br]Mo Particle Complex

Into a Schlenk tube (50 mL), an ethanol solution (2 mL) of HPS-N(C$_2$H$_4$OC$_2$H$_4$OCH$_3$)$_3$Br (200 mg) and a THF solution (15 mL) of Mo(CO)$_6$ (114 mg) were charged and the inside of the flask was purged with nitrogen, followed by refluxing the resultant reaction mixture at 70° C. for 12 hours. The reaction solution was filtered and the filtrate was evaporated to dryness under reduced pressure. The resultant residue was subjected to re-precipitation in THF-hexane and the resultant precipitate was retrieved with a membrane filter to obtain a brown solid (164 mg) of an [HPS-N (C$_2$H$_4$OC$_2$H$_4$OCH$_3$)$_3$Br]Mo particle complex.

Figure 33:
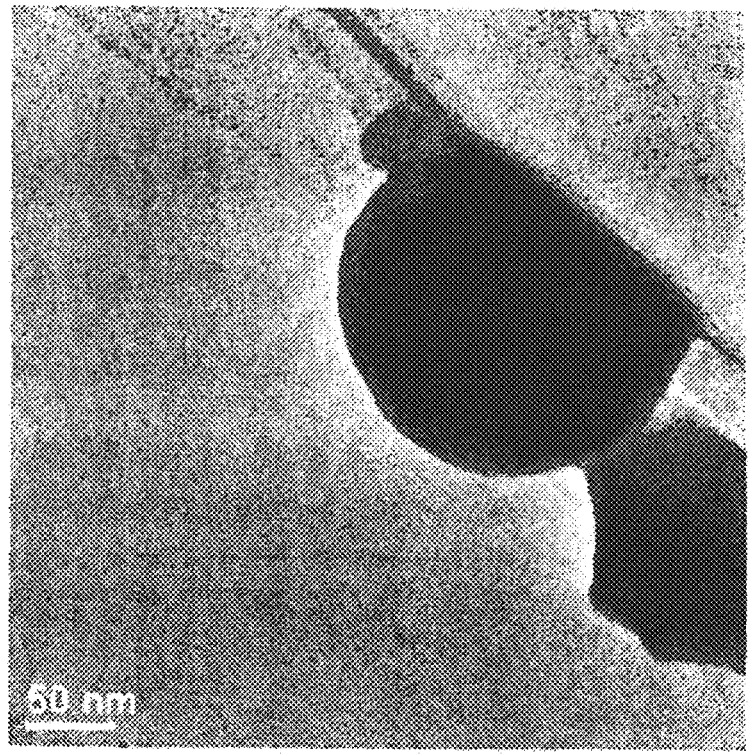
FIG. 33 shows a TEM image of a brown solid obtained in Example 54.

An image of the obtained brown solid observed under TEM is shown in FIG. 33.

Example 55

[HPS-N(C$_2$H$_4$OC$_2$H$_4$OCH$_3$)$_3$Br]Ni Particle Complex

Into a Schlenk tube (50 mL), 5 mL of a methanol solution of HPS-N(C$_2$H$_4$OC$_2$H$_4$OCH$_3$)$_3$Br (119 mg) and 15 mL of THF were charged and the inside of the tube was purged with argon, followed by adding Ni(cod)$_2$ (119 mg) thereto. Inside of the system was purged with hydrogen and then the reaction mixture was stirred at room temperature for 10 hours. The resultant solution was filtered with a membrane filter and then the filtrate was evaporated to dryness under reduced pressure. Next, the resultant residue was subjected to re-precipitation in chloroform-hexane and the resultant precipitate was retrieved with a membrane filter to obtain a black powder (137 mg) of an [HPS-N (C$_2$H$_4$OC$_2$H$_4$OCH$_3$)$_3$Br]Ni particle complex.

Figure 34:
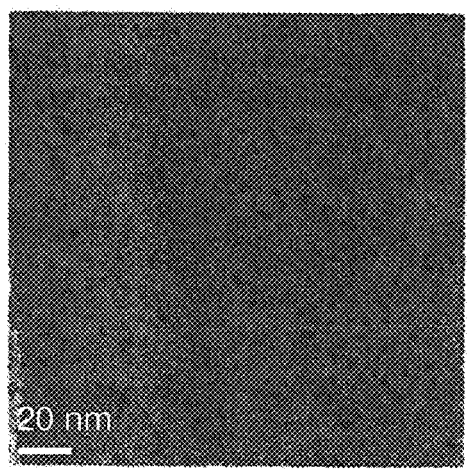
FIG. 34 shows a TEM image of a black powder obtained in Example 55.

An image of the obtained black powder observed under TEM is shown in FIG. 34.

Example 56

[HPS-N(C$_2$H$_4$OC$_2$H$_4$OCH$_3$)$_3$Br]SnO$_2$ Particle Complex 50 mL of an aqueous solution of ammonium hydrogen carbonate (4 g) was charged into an eggplant-shaped flask (100 mL) and thereinto, 10 mL of an aqueous solution of tin tetrachloride pentahydrate (2.6 g) was dropped. The resultant mixture was stirred at room temperature for 2 hours and the resultant colorless gel substance was left at rest over one day and night, followed by subjecting the gel to decantation to remove the supernatant. Next, 30 mL of water was added to the gel and the resultant mixture was stirred and then subjected to a centrifugation at 4,000 rpm for 20 minutes to remove the supernatant. This operation was repeated 4 times and it was confirmed that a chloride ion was not detected in the supernatant. Next, to the resultant precipitate, 20 mL of water and a small amount of ammonia were added to make the pH of the resultant mixture around 10 and then, to the mixture, 20 mg of ammonium nitrate was added. The resultant mixture was stirred in an autoclave at 200° C. under 2 MPa for 12 hours and was subjected to a hydrothermal treatment to obtain a suspension of a light gray solid.

86 mg of a gray solid separated from the suspension was taken and added to a solution of HPS-N (C$_2$H$_4$OC$_2$H$_4$OCH$_3$)$_3$Br (190 mg) in 20 mL of water and 10 mL of methanol and the resultant mixture was stirred at 50° C. for 6 hours. The resultant solution was evaporated to dryness under reduced pressure and the resultant residue was dispersed in chloroform. Thereto, hexane was added to subject the reaction mixture to re-precipitation to obtain a yellow-brown solid (147 mg) of an [HPS-N(C$_2$H$_4$OC$_2$H$_4$OCH$_3$)$_3$Br]SnO$_2$ particle complex.

Figure 35:
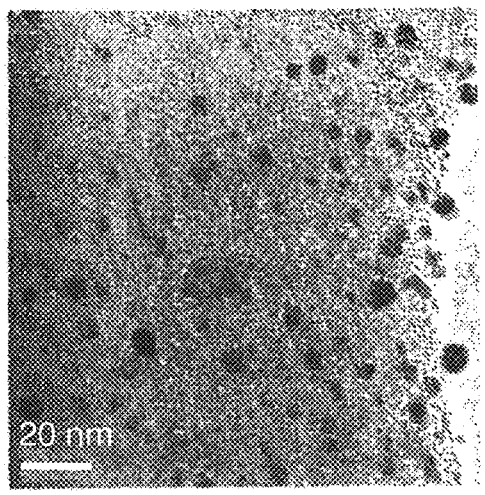
FIG. 35 shows a TEM image of a yellow-brown solid obtained in Example 56.

An image of the obtained yellow-brown solid observed under TEM is shown in FIG. 35.

Example 57

[HPS-N(C$_2$H$_4$OC$_2$H$_4$OCH$_3$)$_3$Br]Pt Particle Complex

Into an eggplant-shaped flask (100 mL), 2 mL of a methanol solution of HPS-N(C$_2$H$_4$OC$_2$H$_4$OCH$_3$)$_3$Br (190 mg), chloroplatinic acid hexahydrate (101 mg), 15 mL of ethanol, and 15 mL of water were charged and the resultant reaction mixture was refluxed at 85° C. for 2 hours. The resultant solution was evaporated to dryness under reduced pressure and the resultant residue was subjected to re-precipitation in chloroform-hexane to obtain a highly viscous black solid (112 mg) of an [HPS-N (C$_2$H$_4$OC$_2$H$_4$OCH$_3$)$_3$Br]Pt particle complex.

Figure 36:
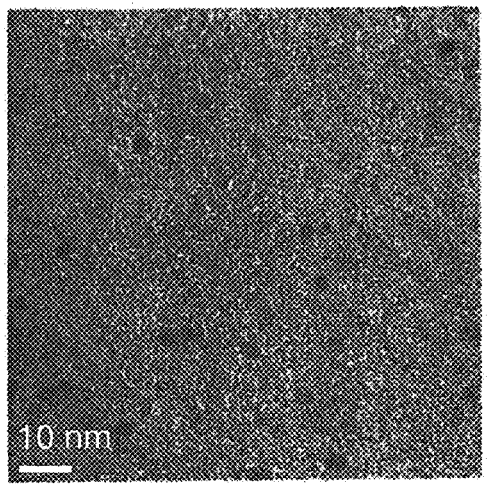
FIG. 36 shows a TEM image of a highly viscous black solid obtained in Example 57.

An image of the obtained highly viscous black solid observed under TEM is shown in FIG. 36. As the result of the observation by photographing under TEM, the particle diameter thereof was found to be 3 to 4 nm.

Example 58

[HPS-N(C$_2$H$_4$OC$_2$H$_4$OCH$_3$)$_3$Br]Ru Particle Complex

Into a Schlenk tube (50 mL), HPS-N(C$_2$H$_4$OC$_2$H$_4$OCH$_3$)$_3$Br (187 mg), 10 mL of ethanol, and 10 mL of water were charged and the resultant reaction mixture was subjected to deoxidation under reduced pressure. Thereto, 15 mL of a solution of ruthenium trichloride (89 mg) in ethanol-water=1:1 and 52 mg of benzophenone were added and while irradiating the resultant reaction mixture with an ultraviolet light using a mercury lamp, the reaction mixture was stirred at room temperature for 2 hours. The resultant reaction solution was filtered with a membrane filter and the resultant filtrate was evaporated to dryness under reduced pressure. The resultant residue was subjected to re-precipitation in chloroform-hexane to obtain a brown solid (60 mg) of an [HPS-N (C$_2$H$_4$OC$_2$H$_4$OCH$_3$)$_3$Br]Ru particle complex.

Figure 37:
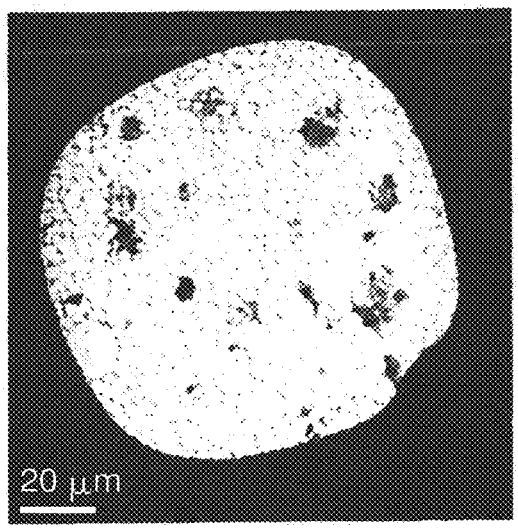
FIG. 37 shows a TEM image of a brown solid obtained in Example 58.

An image of the obtained brown solid observed under TEM is shown in FIG. 37.

[Preparation of Metal Particle Complex in Comparative Examples]

Comparative Example 7

Preparation of an [HPS-DC]Pd Particle Complex

A styrene-based branched polymer (HPS) having a dithiocarbamate group of Formula (6):

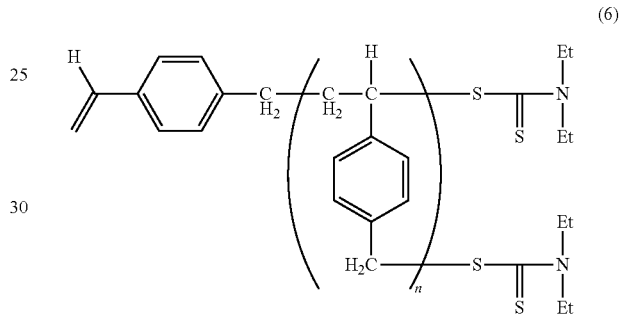

(6)

at a molecule terminal thereof was synthesized referring to a method described in "Koji Ishizu, Akihide Mori, Macromol. Rapid Commun. 21, 665-668 (2000)".

The HPS had a weight average molecular weight Mw of 16,000 and a distribution: Mw (weight average molecular weight)/Mn (number average molecular weight) of 3.2 in terms of polystyrene, which were measured by GPC.

Figure 38:
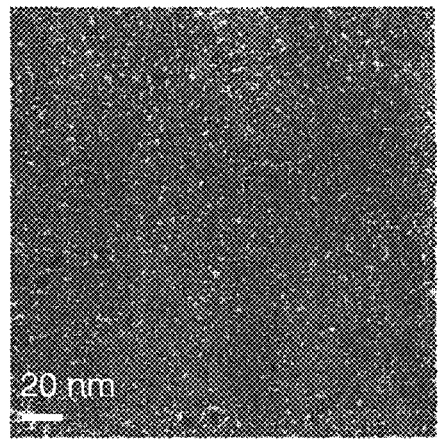
FIG. 38 shows a TEM image of a black precipitate obtained in Comparative Example 7.

Into a Schlenk reaction tube (20 mL), N(Octyl)$_3$Br (21.6 mg) and Pd(OAc)$_2$ (24.3 mg) were charged and the inside of the tube was purged with nitrogen. Thereto, 10 mL of tetrahydrofuran was added and the inside of the system was purged with hydrogen. To the solution stirred at room temperature for 12 hours, the above HPS-DC (53.5 mg) was added to stir the resultant reaction mixture at 60° C. over one night. The resultant reaction solution was added to hexane (50 mL) and the resultant reaction mixture was subjected to re-precipitation purification. The resultant precipitate was filtered and dried under reduced pressure to obtain 101.2 mg of a black precipitate of an HPS-Pd particle complex. An image of the obtained black precipitate observed under TEM is shown in FIG. 38. As the result of the observation by observing under TEM, the particle diameter of the [HPS-DC]Pd particle complex was found to be 5 nm.

[Hydrogenation of Stilbene Using Complex of Comparative Example]

Into a 30 mL two-neck flask, the [HPS-DC]Pd particle complex prepared according to Comparative Example 7 (30 mg) and trans-stilbene [manufactured by Tokyo Chemical Industry Co., Ltd.] (180 mg, 1 mmol) were charged and the inside of the flask was purged with hydrogen, followed by stirring the resultant reaction mixture at room temperature for 24 hours. The reaction did not progress at all and recovered were only raw materials.

Example 59

[HPS-N($C_2H_4OC_2H_4OCH_3$)$_3$Br]Pt Particle Complex

Into an eggplant-shaped flask (100 mL), 2 mL of a methanol solution of HPS-N($C_2H_4OC_2H_4OCH_3$)$_3$Br (190 mg), chloroplatinic acid hexahydrate (101 mg), 15 mL of ethanol, and 15 mL of water were charged and the resultant reaction mixture was refluxed at 85° C. for 2 hours. The resultant solution was evaporated to dryness under reduced pressure and the resultant residue was subjected to re-precipitation in chloroform-hexane to obtain a highly viscous black solid (112 mg) of an [HPS-N($C_2H_4OC_2H_4OCH_3$)$_3$Br]Pt particle complex. The content of platinum was measured by a DTA-TG measurement and was found to be 17.7% by mass.

Figure 39:
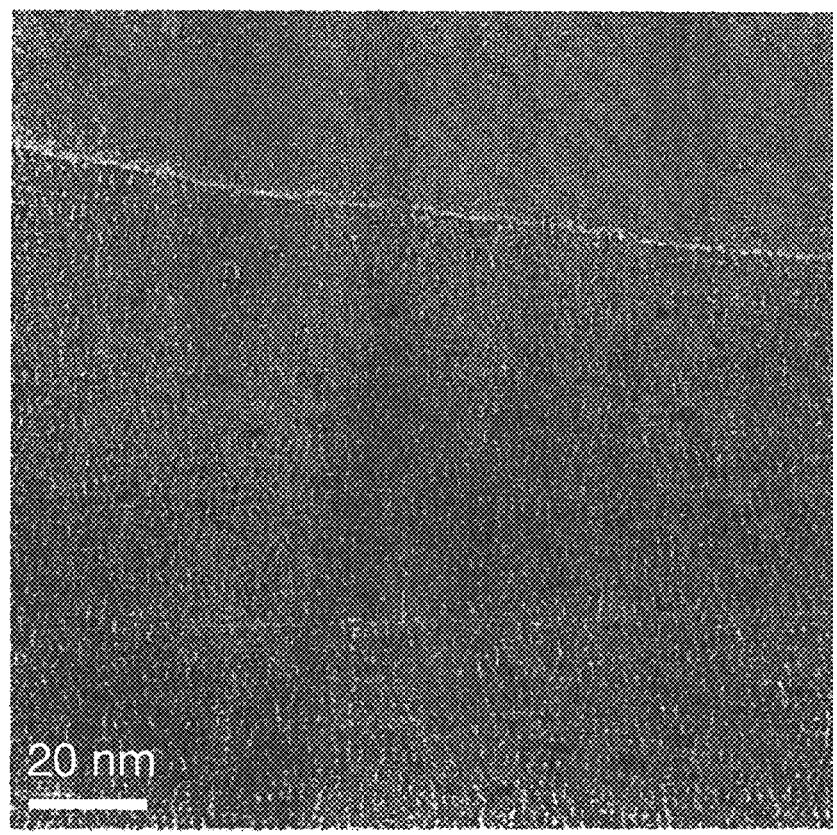
FIG. 39 shows a TEM image of a black precipitate obtained in Example 59.

An image of the obtained highly viscous black solid observed under TEM is shown in FIG. 39. As the result of the observation by photographing under TEM, the particle diameter was found to be 3 to 4 nm.

[Reduction of Carbonyl Compound in Water Using Pt Particle Complex]

Examples 60 to 65

The [HPS-N($C_2H_4OC_2H_4OCH_3$)$_3$Br]Pt particle complex (10 mg) produced in Example 59, $H_2O$ (10 mL), and 3.0 mmol of each of the carbonyl compounds described in Table 8 were charged into a 100 mL autoclave and the resultant reaction mixture was heated and stirred at 70° C. under a hydrogen pressure of 3.0 MPa for 24 hours. The reaction solution was extracted with dichloromethane and the organic phase was retrieved and dehydrated over $MgSO_4$, followed by distilling off the solvent under reduced pressure to obtain a crude product. The objective compound was purified and isolated by subjecting the crude product to silica gel column chromatography using a hexane:ethyl acetate=5:1 solution as an eluting solvent. The inversion rate was measured by G.C.

The result of the reduction reaction of various carbonyl compounds is shown in Table 8.

TABLE 8

| | Raw material | Product | Inversion rate (%) | Yield (%) |
| --- | --- | --- | --- | --- |
| Example 60 | cyclopentanone | cyclopentanol | 56% | 39% |
| Example 61 | acetophenone | 1-phenylethanol | >99% | 60% |
| Example 62 | propiophenone | 1-phenyl-1-propanol | 95% | 82% |
| Example 63 | 2'-methylacetophenone | 1-(2-methylphenyl)ethanol | 35% | 20% |
| Example 64 | 4'-methylacetophenone | 1-(4-methylphenyl)ethanol | 95% | 68% |
| Example 65 | 4'-aminoacetophenone | 1-(4-aminophenyl)ethanol | 64% | 48% |

Comparative Examples 8 to 11

As Comparative Examples 8 to 11, the reduction reaction of pentanone shown in Example 60 was effected by changing the reaction solvent from water to a solvent other than water and the result thereof is shown in Table 9.

TABLE 9

| | Solvent | Inversion rate |
|---|---|---|
| Example 60 (reference) | Water | 56% |
| Comparative Example 8 | THF | n.d. |
| Comparative Example 9 | Water/THF = 1:1 | n.d. |
| Comparative Example 10 | $CHCl_3$ | n.d. |
| Comparative Example 11 | EtOH | 12% |

[Hydrogenation Reaction of Various Compounds in Water Using Pt Particle Complex]

Examples 66 to 67

The [HPS-N($C_2H_4OC_2H_4OCH_3$)$_3$Br]Pt particle complex (4 mg) produced in Example 59, $H_2O$ (5 mL), and 1.0 mmol of each of the aromatic compounds described in Table 10 were charged into a 30 mL eggplant-shaped flask and the reaction was performed in a hydrogen atmosphere at room temperature for 12 hours. The inversion rate of the reaction was measured by G.C. and the determination of the compound was performed by $^1$H NMR. The result thereof is shown in Table 10.

As shown in Table 8 to Table 10, it was confirmed that by using the Pt particle complex of the present invention, a reduction reaction of a ketone, an aldehyde, an olefin, and the like is progressed in water.

As shown in Examples 61 to 65 and Examples 66 and 67, there could be obtained such a result that the reduction reaction can selectively be effected according to the functional group.

RELATED-ART DOCUMENTS

Patent Documents

Patent Document 1: Japanese Patent Application Publication No. JP-A-2003-193118
Patent Document 2: Japanese Patent Application Publication No. JP-A-2008-37884
Patent Document 3: Japanese Patent Application Publication No. JP-A-2002-1095
Patent Document 4: Japanese Patent Application Publication No. JP-A-2002-179931
Patent Document 5: Japanese Patent Application Publication No. JP-A-2003-208900
Patent Document 6: International Publication No. WO 2008/029688 pamphlet

Non-Patent Documents

Non-patent Document 1: Journal of Chemical Society, Chemical Communication, p. 801 (1994)
Non-patent Document 2: Journal of the American Chemical Society, No. 127, p. 7328 (2005)
Non-patent Document 3: Metal Nanoparticles, D. L. Feldheim, C. A. Foss, Jr. Eds.; Marcel Dekker: New York, 2002

The invention claimed is:
1. A complex comprising:
 a metal fine particle dispersant comprising a branched polymer compound having an ammonium group and having a weight average molecular weight of 500 to 5,000,000; and

TABLE 10

| | Objective | Solvent | Raw material | Product | Inversion rate (%) |
|---|---|---|---|---|---|
| Example 66 | Aldehyde C=O aromatic ring compound | $H_2O$ THF | (4-hydroxy-3-methoxybenzaldehyde) | (4-hydroxy-3-methoxybenzyl alcohol) | >99% n.r. |
| Example 67 | Carboxylic acid C=O olefin compound | $H_2O$ THF | (maleic acid) | (succinic acid) | >99% >99% |

Example 66: 70° C., $H_2$ 30 atm, 24 hrs, s/c = 300
Example 67: room temp., $H_2$ 1 atm, 12 hrs, s/c = 200 a metal fine particle, wherein
the metal fine particle comprises platinum (Pt) or palladium (Pd),
the metal fine particle dispersant comprises a branched polymer compound of Formula (1):

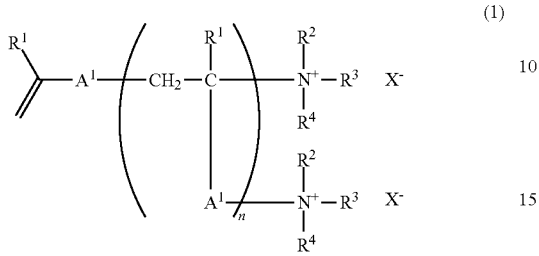

wherein
$R^1$ is a hydrogen atom,
$R^2$, $R^3$, and $R^4$ are independently a hydrogen atom, a linear, branched, or cyclic $C_{1-20}$ alkyl group, a $C_{6-20}$ arylalkyl group,
wherein the alkyl group and the arylalkyl group are optionally substituted with an alkoxy group, a hydroxy group, an ammonium group, a carboxy group, or a cyano group, or —$(CH_2CH_2O)_m$—$R^5$, wherein $R^5$ is a hydrogen atom or a methyl group, and m is an arbitrary integer of 2 to 100, or
$R^2$, $R^3$, and $R^4$ are optionally bonded to each other through a linear, branched, or cyclic alkylene group to form a ring together with a nitrogen atom to which $R^2$, $R^3$, and $R^4$ are bonded,
wherein at least one of $R^2$, $R^3$, and $R^4$ is an octyl group or a dodecyl group,
$X^-$ is an anion,
$A^1$ is a structure of Formula (2):

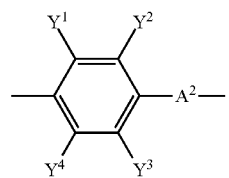

wherein:
$A^2$ is a linear, branched, or cyclic $C_{1-30}$ alkylene group that optionally contains an ether bond or an ester bond, and
$Y^1$, $Y^2$, $Y^3$, and $Y^4$ are a hydrogen atom, and
n is the number of repeating unit structures that is an integer of 2 to 100,000, and
the complex has a higher catalyst activity compared to a same complex that does not have the branched polymer compound of Formula (1).

2. The complex according to claim 1, wherein the metal fine particle has an average particle diameter of 1 nm or more to 100 nm or less.

3. The complex according to claim 1, wherein the branched polymer compound has a degree of distribution Mw (weight average molecular weight)/Mn (number average molecular weight) of 1 to 7.

* * * * *